(12) United States Patent
Nishikubo et al.

(10) Patent No.: US 6,906,116 B2
(45) Date of Patent: Jun. 14, 2005

(54) UNSATURATED POLYESTER COMPOUNDS, RESINS CURABLE WITH ACTINIC ENERGY RAY, PROCESSES FOR THE PRODUCTION THEREOF, AND CURABLE COMPOSITIONS

(75) Inventors: Tadatomi Nishikubo, Fujisawa (JP); Atsushi Kameyama, Yokohama (JP); Masaki Sasaki, Asaka (JP); Masatoshi Kusama, Sakado (JP)

(73) Assignees: Kanagawa University (JP); Taiyo Ink Manufacturing Co., Ltd. (JP)

( * ) Notice: Subject to any disclaimer, the term of this patent is extended or adjusted under 35 U.S.C. 154(b) by 21 days.

(21) Appl. No.: 10/640,311

(22) Filed: Aug. 14, 2003

(65) Prior Publication Data

US 2004/0039087 A1 Feb. 26, 2004

Related U.S. Application Data

(63) Continuation of application No. PCT/JP02/01249, filed on Feb. 14, 2002, now abandoned.

(30) Foreign Application Priority Data

Feb. 15, 2001 (JP) ........................................ 2001-038579
Feb. 15, 2001 (JP) ........................................ 2001-038788

(51) Int. Cl.$^7$ ........................ C09D 167/07; C08L 67/07
(52) U.S. Cl. ....................... 522/104; 522/107; 522/168; 522/170; 522/183; 528/271; 528/272; 528/298
(58) Field of Search ............................... 522/104, 107, 522/168, 170, 183, 181; 528/271, 272, 298, 417; 560/209

(56) References Cited

U.S. PATENT DOCUMENTS

| | | | | |
|---|---|---|---|---|
| 4,014,855 A | * | 3/1977 | Wear .......................... | 528/176 |
| 6,069,187 A | * | 5/2000 | Kusumoto et al. .......... | 522/108 |
| 2003/0009053 A1 | * | 1/2003 | Nishikubo et al. .......... | 560/208 |
| 2003/0153723 A1 | * | 8/2003 | Nishikubo et al. .......... | 528/327 |
| 2003/0216514 A1 | * | 11/2003 | Nishikubo et al. .......... | 525/108 |
| 2004/0023120 A1 | * | 2/2004 | Nishikubo et al. .......... | 429/253 |

FOREIGN PATENT DOCUMENTS

| | | |
|---|---|---|
| JP | 10-168120 A1 | 6/1998 |
| JP | 2000-159858 A1 | 6/2000 |
| JP | 2000-321765 A1 | 11/2000 |
| JP | 2001-040073 A1 | 2/2001 |

OTHER PUBLICATIONS

"New Addition Reactions of Cyclic Ethers with Esters and Thioesters Catalyzed by Quaternary Ammonium Salts or Crown Ether Complexes", Chemistry Letters, pp. 697–700, 1991, Tadatomi Nishikubo and Kazuya Sato.

"A Novel Synthesis of Polyesters with Pendant Hydroxyl Groups by Polyaddition of bis(oxetane) with Dicarboxylic Acids Catalyzed by Quaternary Onium Salts", Reactive & Functional Polymers 37 (1998), 19–25, Tadatomi Nishikubo, Atsushi Kameyama, Akira Suzuki.

International Search Report, May 28, 2002.

* cited by examiner

*Primary Examiner*—Susan Berman
(74) *Attorney, Agent, or Firm*—Rader, Fishman & Grauer PLLC

(57) ABSTRACT

An unsaturated polyester compound having an ethylenically unsatureated group in its terminal and hydroxymethyl group in its side chain is obtained by the reaction of (a) a compound containing at least two oxetane rings in its molecule with (b) a compound containing at least two carboxyl groups in its molecule and (c) an unsaturated monocarboxylic acid in the presence of a reaction promotor in such a proportion that the ratio of said compound (b) to said compound (a) falls in the range of 0.1<(b)/(a)<1. BY further reacting (d) a polybasic acid anhydride with the resultant unsaturated polyester compound (A'), there is obtained an actinic energy ray-curable resin which is soluble in an aqueous alkaline solution. A photocurable and/or thermosetting composition is obtained by mixing the unsaturated polyester compound (A') and/or the actinic energy ray-curable resin with a polymerization initiator (B).

20 Claims, 3 Drawing Sheets

UNSATURATED POLYESTER COMPOUNDS, RESINS CURABLE WITH ACTINIC ENERGY RAY, PROCESSES FOR THE PRODUCTION THEREOF, AND CURABLE COMPOSITIONS

CROSS-REFERENCE TO RELATED APPLICATION

This is a continuation of Application PCT/JP02/01249, filed Feb. 14, 2002, now abandoned.

BACKGROUND OF THE INVENTION

1. Field of the Invention

This invention relates to a novel unsaturated polyester compound which can be advantageously used as a photocuring component and/or thermosetting component in various field of application, an alkali-soluble and actinic energy ray-curable resin obtained therefrom, and processes for the production thereof.

This invention further relates to a curable composition which contains the unsaturated polyester compound mentioned above and hardens promptly by irradiation of an actinic energy ray such as an ultraviolet ray or an electron beam or further hardens by heating to give a cured product exhibiting high flexibility (flexing resistance) and strength in combination and excelling in adhesiveness to a substrate. More particularly, this invention relates to an actinic energy ray-curable resin composition which contains the actinic energy ray-curable resin mentioned above and is capable of producing a coating film which can be developed with an aqueous alkaline solution and excels in resistance to heat, electrical insulation properties, adhesiveness, etc.

2. Description of the Prior Art

The curing of resin by irradiation of an actinic energy ray is widely utilized in painting of metal, coating of wood, printing ink, electronic materials, etc owing to its high curing speed. A photocurable composition used in these technical fields generally comprises an unsaturated double bond-containing prepolymer, a polymerizable monomer, and a photopolymerization initiator as essential components. As the above-mentioned prepolymer mainly used as a photocuring component, a polyester acrylate, a urethane acrylate, and an epoxy acrylate may be cited. Since these prepolymers contain polymerizable unsaturated groups therein, they can be cross-linked by mixing with a compound which generates radicals by irradiation of an actinic energy ray (photopolymerization initiator).

However, since a polyester acrylate has substantially no polar group such as hydroxyl group in its side chain, it can not be subjected to a further modification reaction. On the other hand, although a urethane acrylate excels in adhesiveness to a substrate, its usage is limited because it has a urethane linkage which is poor in heat resistance. An epoxy acrylate is most excellent in physical properties and used in various application fields. However, at present the composition containing this compound is inferior in the adhesiveness because it has mainly secondary hydroxyl groups.

Further, since the radically polymerizable prepolymers mentioned above generally has a small molecular weight and cures in an instant by irradiation of an actinic energy ray, thereby causing residual stress in the cured product, they pose the problem of decreasing the adhesiveness to a substrate and mechanical properties. For the purpose of solving such problems, the composition which employs the cationic polymerization of oxetane as a curing reaction has been proposed. However, the kinds of materials which can be used in this reaction are small in compared with radically polymerizable prepolymers or monomers, it was possible to attain the desired properties of the cured product only with difficulty.

Meanwhile, as to the practical application of a curable composition, for instance, in the soldering process which is carried out in mounting electronic parts on a printed circuit board, a solder resist is used for the purpose of preventing molten solder from adhering to irrelevant portions and protecting circuits. In recent years, a developing type solder resist which is used to form a pattern by a photolithographic method is widely adopted. Particularly, with due respect to the problem of environmental safety and from the viewpoint of cost, the solder resist of the alkali developing type has come to play the leading role. As a base resin used for these developing type solder resists, a photosensitive resin obtained by the reaction of an epoxy resin with (meth) acrylic acid and the subsequent reaction of an acid anhydride with the resultant hydroxyl group of the modified resin is generally used.

In recent years, in consequence of the trend of IC and LSI parts toward highly dense mounting, the necessity of decreasing the width of circuit lines and the intervals between circuits of the printed circuit boards has been finding growing recognition. Besides, since the operating frequency of these parts to be mounted is enhanced, the heat value released from these parts increases accordingly. Therefore, the printed circuit board tends to require high thermal stability more than desired heretofore. In the photosensitive resin obtained by using an epoxy resin as a starting raw material, however, since most of the functional groups which bond to an acid anhydride are secondary hydroxyl groups, the resin has the problem of relatively easily suffering the breakage of bonds when exposed to an increased temperature for a long time and, as result, inducing the possibility of degradation of such properties as insulation properties and resistance to heat and contamination of circuits due to the scattering of the decomposed acid anhydride. In the photosensitive resin obtained by using a cresol novolak type epoxy resin as a starting raw material, its cured product is hard and brittle. Accordingly, the application of the resin is restricted because of the possibility of causing cracks during the step of heat cycle, and the resin can not be applied to a flexible circuit board.

To solve such problems, for example, published Japanese Patent Application, KOKAI (Early Publication) No. (hereinafter referred to briefly as "JP-A-") 2000-159858 discloses a photosensitive resin obtained by the reaction of an epoxy resin with an unsaturated monocarboxylic acid and further with a special acid anhydride. Further, JP-A-2000-321765 discloses a photosensitive resin obtained by the addition reaction of an epoxy resin with a mixture of an unsaturated monocarboxylic acid and a saturated monocarboxylic acid and subsequent modification with an acid anhydride. In either case, however, since the starting raw material is an epoxy resin, it is difficult to improve the hard and brittle natures of the epoxy resin. Accordingly, the problems heretofore pointed out have not been solved yet.

In recent years, from the viewpoints of creation of a new organic reaction and its application to the synthesis of macromolecular compounds, the organic synthesis involving the ring opening addition reaction of an oxetane ring which is an ether of four-membered ring has been studied. For example, the addition reaction of an oxetane compound and an active ester (T. Nishikubo and K. Sato, Chem. Lett., 697 (1992)) and the synthesis of polyester having a primary hydroxyl group attached to a side chain thereof by the polyaddition reaction of a polyfunctional oxetane and a dicarboxylic acid (T. Nishikubo, A. Kameyama, and A. Suzuki, Reactive & Functional Polymers, 37, 19 (1998)) have been studied and reported.

Further, JP-A-10-168120 discloses a method of producing an actinic energy ray-curable resin by the ring opening addition reaction of an oxetane group-containing. (meth)

acrylate monomer with a carboxyl group-containing resin or by the ring opening addition reaction of an oxetane group-containing resin with a carboxyl group-containing unsaturated monomer.

However, none of the published literatures mentioned above discloses the compounds of the present invention, actinic energy ray-curable resins obtained therefrom, and a curable composition using them.

SUMMARY OF THE INVENTION

An object of the present invention, therefore, is to provide an unsaturated polyester compound which hardens promptly by short time irradiation of an actinic energy ray and also hardens by heating, thereby capable of producing a cured product excelling in adhesiveness to a substrate owing to a primary hydroxyl group in its side chain and other various properties.

A further object of the present invention is to provide a method for the production of such an unsaturated polyester compound with high productivity.

Another object of the present invention is to provide a novel alkali-soluble and actinic energy ray-curable resin obtained from the unsaturated polyester compound mentioned above and excelling in resistance to heat, thermal stability, and toughness.

Yet another object of the present invention is to provide a method for the production of such an actinic energy ray-curable resin with high productivity.

Still further object of the present invention is to provide a curable composition which hardens promptly by irradiation of an actinic energy ray such as an ultraviolet ray or an electron beam and also hardens by heating, thereby capable of producing a cured product exhibiting high flexibility (flexing resistance) and strength in combination and excelling in various properties such as adhesiveness to a substrate, particularly an actinic energy ray-curable resin composition which is developable with an alkaline solution.

To accomplish the objects mentioned above, in accordance with the first aspect of the present invention, there is provided an unsaturated polyester compound (A') having an ethylenically unsaturated group in its terminal and hydroxymethyl group as a pendant group attached to its main chain, which is obtained by the reaction of (a) a compound containing at least two oxetane rings in its molecule with (b) a compound containing at least two carboxyl groups in its molecule and (c) an unsaturated monocarboxylic acid.

A preferred embodiment provides an unsaturated polyester compound represented by the following general formula (1) and having an ethylenically unsaturated group in its terminal and hydroxymethyl group as a pendant group attached to its main chain:

an alkyl group of 1 to 6 carbon atoms, an aryl group, an aralkyl group, a cyano group, a fluorine atom, or a furyl group, and n is an integer of 1 to 300, preferably 1 to 150, more preferably to 50.

Since the unsaturated polyester compound (A') of the present invention has the particular structure containing a primary hydroxyl group caused by the ring opening reaction of the oxetane ring and an unsaturated group in combination, it is capable of curing promptly by short-time irradiation of an actinic energy ray, further capable of thermally curing by heat radicals owing to the presence of the unsaturated double bond and also thermally curing by addition of a curing agent (for example, isocyanates) which can react with a hydroxyl group owing to the presence of the primary hydroxyl group in a side chain mentioned above. Further, the resultant cured product exhibits excellent adhesiveness to various substrates owing to the hydrogen bonding nature of the primary hydroxyl group. Accordingly, the unsaturated polyester compound of the present invention can be used in various application fields as a photocuring component and a thermosetting component of a curable composition.

In accordance with the second aspect of the present invention, there is provided a process of producing the unsaturated polyester compound characterized by comprising causing the reaction of (a) a compound containing at least two oxetane rings in its molecule with (b) a compound containing at least two carboxyl groups in its molecule and (c) an unsaturated monocarboxylic acid in the presence of a reaction promotor in such a proportion that the molar ratio of the compound (b) to the compound (a) mentioned above falls in the range of $0.1 < (b)/(a) < 1$.

By such a method of the present invention, it is possible to produce the unsaturated polyester compound mentioned above with a high yield.

In accordance with the third aspect of the present invention, there is provided an actinic energy ray-curable resin (A) obtained by further reacting (d) a polybasic acid anhydride with the unsaturated polyester compound (A') mentioned above.

Since the actinic energy ray-curable resin (A) of the present invention is obtained by further reacting a polybasic acid anhydride (d) with the unsaturated polyester compound. (A') mentioned above, it is capable of curing promptly by short-time irradiation of an actinic energy ray, soluble in an aqueous alkaline solution, and excellent in thermal stability and resistance to heat.

In accordance with the fourth aspect of the present invention, there is provided a process of producing an actinic energy ray-curable resin characterized by comprising further causing the reaction of (d) a polybasic acid anhydride with the unsaturated polyester compound (A') mentioned above, wherein the unsaturated polyester compound (A') mentioned

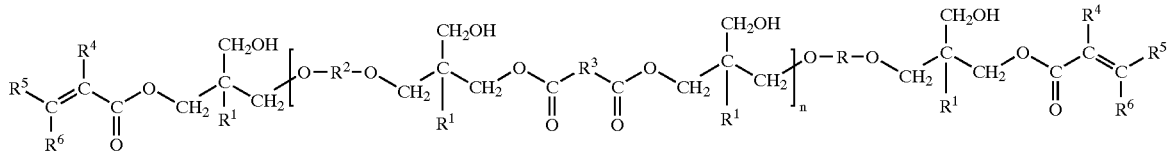

(1)

wherein $R^1$ represents a hydrogen atom or an alkyl group of 1 to 6 carbon atoms, $R^2$ represents a divalent oxetane residue, $R^3$ represents a dicarboxylic acid residue, $R^4$, $R^5$, and $R^6$ independently represent a hydrogen atom, above is produced by the reaction of (a) a compound containing at least two oxetane rings in its molecule with (b) a compound containing at least two carboxyl groups in its molecule and (c) an unsaturated monocarboxylic acid in the presence of a reaction promotor in such a proportion that the molar ratio of the compound (b) to the compound (a) mentioned above falls in the range of 0.1<(b)/(a)<1. In a preferred embodiment, 0.1 to 1.0 mol of the polybasic acid anhydride (d) is caused to react with one chemical equivalent of the hydroxymethyl group of the unsaturated polyester compound (A') mentioned above.

By such a method of the present invention, it is possible to produce the actinic energy ray-curable resin mentioned above with a high yield.

According to the fifth aspect of the present invention, there is provided a curable composition characterized by comprising (A') the unsaturated polyester compound mentioned above and (B) a polymerization initiator as essential components. In a preferred embodiment, the unsaturated polyester compound (A') mentioned above is represented by the general formula (1) mentioned above and has an ethylenically unsaturated group in its terminal and hydroxymethyl group as a pendant group attached to its main chain.

Furthermore, according to the sixth aspect of the present invention, there is provided a curable composition containing an actinic energy ray-curable resin. A fundamental embodiment thereof is characterized by comprising (A) the actinic energy ray-curable resin mentioned above and (B) a photopolymerization initiator as essential components. A more preferred embodiment is characterized by comprising as essential components (A) the actinic energy ray-curable resin mentioned above, (B) a photopolymerization initiator, (C) a diluent, and (D) a compound containing at least two oxirane groups and/or oxetanyl groups in its molecule.

The curable composition of the present invention containing the unsaturated polyester compound mentioned above as a photocuring component and/or a thermosetting component cures promptly by short-time irradiation of an actinic energy ray and also is curable by heating. Furthermore, since the unsaturated polyester compound has a main chain of a linear chain structure comprising ether linkages and ester linkages, the composition containing this compound as a curing component exhibits little shrinkage on curing and gives a cured product excelling in adhesiveness to various substrates, exhibiting high flexibility (flexing resistance) and strength in combination and further possessing good mechanical properties owing to the polyester structure of the main chain.

Further, the curable composition of the present invention containing the actinic energy ray-curable resin mentioned above as a photocuring component cures promptly by short-time irradiation of an actinic energy ray such as an ultraviolet ray and an electron beams, can be developed with an alkaline solution, and gives a cured product exhibiting high flexibility (flexing resistance) and strength in combination and excelling in various properties such as adhesiveness to a substrate, resistance to heat, thermal stability, and electrical insulation properties.

DETAILED DESCRIPTION OF THE INVENTION

Figure 1:
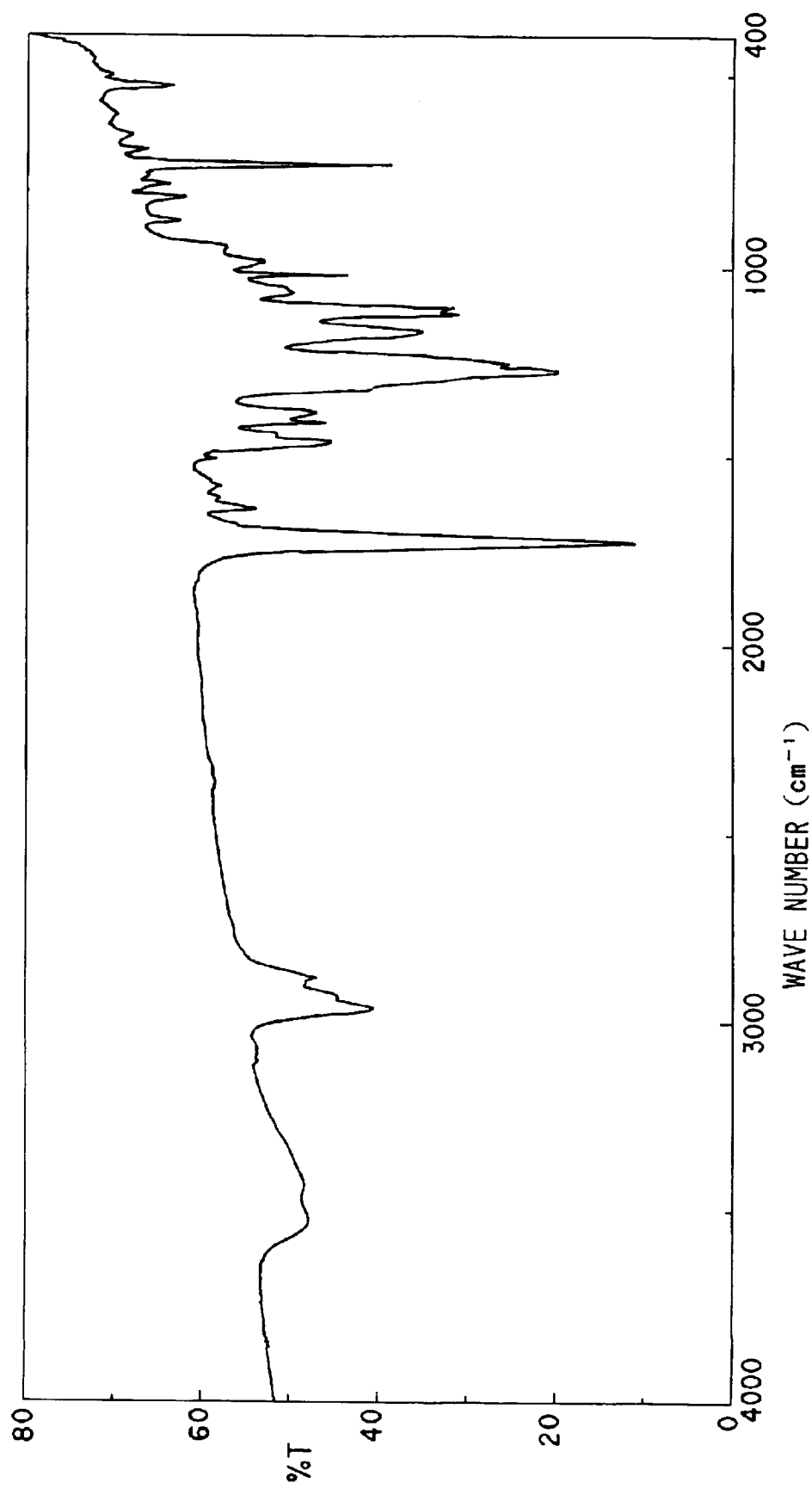
FIG. 1 shows the IR spectrum of the unsaturated polyester compound produced in Synthesis Example 1.

The present inventors have found that when the polyaddition reaction of (a) a compound containing at least two oxetane rings in its molecule (hereinafter referred to as "polyfunctional oxetane compound") with (b) a compound containing at least two carboxyl groups in its molecule (hereinafter referred to as "polyfunctional carboxylic acid") is carried out in the presence of (c) an unsaturated monocarboxylic acid and/or by adding (c) an unsaturated monocarboxylic acid after completion of the polyaddition reaction to effect further addition reaction, there is obtained an unsaturated polyester compound (A') having a polymerizable unsaturated group introduced into a terminal of the polymer and hydroxymethyl group that is a primary hydroxyl group as a pendant group attached to its main chain, and that since this compound has the particular structure containing a primary hydroxyl group caused by the ring opening reaction of the oxetane ring and an end unsaturated double bond in combination, it is capable of curing promptly by short-time irradiation of an actinic energy ray, further thermally curing by heat radicals owing to the presence of the unsaturated double bond and also thermally curing by addition of a curing agent (for example, isocyanates) which can react with a hydroxyl group owing to the presence of the primary hydroxyl group in a side chain mentioned above. The present inventors have further found that the resultant cured product exhibits excellent adhesiveness to various substrates owing to the hydrogen bonding nature of the primary hydroxyl group and that since the unsaturated polyester compound has a main chain of a linear chain structure comprising ether linkages and ester linkages, the composition containing this compound as a curing component exhibits little shrinkage on curing and gives a cured product exhibiting high flexibility (flexing resistance) and strength in combination and further possessing good mechanical properties owing to the polyester structure of the main chain. The present inventors have developed an industrially advantageous method for the production of such a compound.

The present inventors, after pursuing a diligent study, have further found that the actinic energy ray-curable resin (A) having carboxyl groups introduced into the aforementioned unsaturated polyester compound (A') having the structure comprising ether linkages and ester linkages in its main chain as a backbone polymer of the resin exhibits little shrinkage on curing and gives a cured product exhibiting high flexibility (flexing resistance) and strength in combination and further possessing good mechanical properties and that the introduction of carboxyl groups by reacting a polybasic acid anhydride to the hydroxymethyl group, which is a primary hydroxyl group, of the aforementioned unsaturated polyester compound (A') gives an actinic energy ray-curable resin which excels in resistance to heat and thermal stability and is soluble in an aqueous alkaline solution. The present inventors have also developed an industrially advantageous method for the production of such a resin.

Specifically, the actinic energy ray-curable resin of the present invention is obtained by further reacting a polybasic acid anhydrive (d) with the unsaturated polyester compound (A') having an ethylenically unsaturated group in its terminal and hydroxymethyl groups as a pendant group attached to its main chain, which compound is obtained by the reaction of a polyfunctional oxetane compound (a) with a polyfunctional carboxylic acid (b) and an unsaturated monocarboxylic acid (c). This resin excels in thermal stability and resistance to heat because the functional group to which the polybasic acid anhydride bonds is hydroxymethyl group that is a primary hydroxyl group.

Further, since the actinic energy ray-curable resin of the present invention is possessed of carboxyl groups introduced by the reaction of a polybasic acid anhydride (d) to the hydroxymethyl group of the aforementioned unsaturated polyester compound (A'), it is soluble in an aqueous alkaline solution. Accordingly, the actinic energy ray-curable composition containing this resin as a photocuring component cures promptly by short-time irradiation of an actinic energy ray and the unexposed part of the composition can be developed with an aqueous alkaline solution.

Now, the present invention will be described in detail below. First, the unsaturated polyester compound of the present invention and a method for the production thereof will be described.

The unsaturated polyester compound (A') of the present invention is obtained by the reaction of a polyfunctional oxetane compound (a) with a polyfunctional carboxylic acid (b) and an unsaturated monocarboxylic acid (c) and is an actinic energy ray-curable resin having a polymerizable unsaturated group in its terminal and a thermosetting resin as well. This compound can be produced by a simple step in the presence of a reaction promotor, such as a tertiary amine, a quaternary onium salt, and a tertiary phosphine. The synthesis of this unsaturated polyester compound (A') may be carried out by either method of adding the unsaturated monocarboxylic acid (c) into the reaction mixture after completion of the polyaddition reaction of the polyfunctional oxetane compound (a) with the polyfunctional carboxylic acid (b) or carrying out the reaction of three component, the polyfunctional oxetane compound (a), the polyfunctional carboxylic acid (b), and the unsaturated monocarboxylic acid (c) in one pot. In either method, the polyaddition reaction of the polyfunctional oxetane compound (a) with the polyfunctional carboxylic acid (b) proceeds firstly.

The reaction process is as follows:

① First, the polyaddition reaction of the polyfunctional oxetane compound (a) with the polyfunctional carboxylic acid (b) proceeds as represented by the following reaction formula, for example. This reaction proceeds substantially theoretically by using the polyfunctional oxetane compound (a) in an amount larger than that of the polyfunctional carboxylic acid (b) and a compound having oxetane rings in its both terminals is obtained. Although a linear compound is obtained as represented by the following reaction formula when a bifunctional bisoxetane compound and a bifunctional dicarboxylic acid are used, when either one of the oxetane compound and the carboxylic acid is trifunctional, for example, when a trifunctional or more polyfunctional oxetane compound and a bifunctional dicarboxylic acid are used, or when a bifunctional bisoxetane compound and a trifunctional or more polyfunctional carboxylic acid are used, a hyperbranched compound having the multiply branched structure is obtained. It is expected that such a compound should possess high reactivity and excellent mechanical properties owing to the presence of a large number of end functional groups and its specific structure.

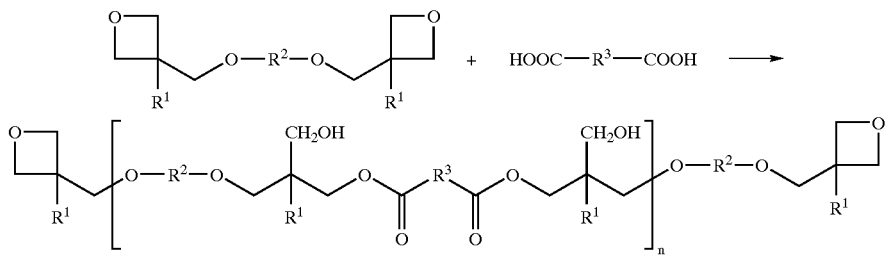

In the above reaction formula, $R^1$ represents a hydrogen atom or an alkyl group of 1 to 6 carbon atoms, $R^2$ represents a bifunctional oxetane residue, and $R^3$ represents a dicarboxylic acid residue.

② Next, the ring opening reaction of the terminal oxetane rings of the product of the polyaddition reaction mentioned above with an unsaturated monocarboxylic acid (c) takes place as represented by the following reaction formula, thereby producing the unsaturated polyester compound of the present invention. Incidentally, it is expected that the unreacted polyfunctional carboxylic acid reacts to one terminal oxetane ring and this terminal carboxyl group remains in the unreacted state as it is. Since this compound is also an unsaturated polyester compound having a polymerizable unsaturated group introduced into one terminal thereof and primary hydroxyl groups in its side chain, it is allowed to be mixed with the other compound.

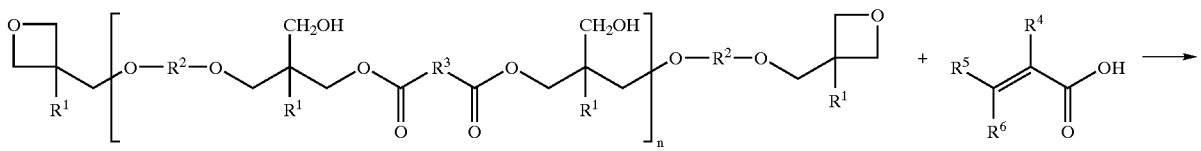

-continued

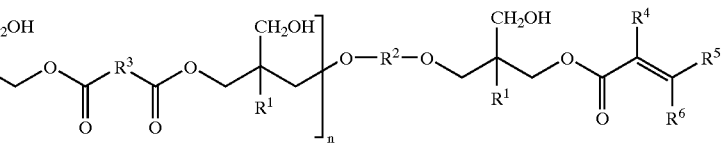

In the above reaction formula, $R^1$, $R^2$ and $R^3$ represent the same meanings as mentioned above, $R^4$, $R^5$, and $R^6$ independently represent a hydrogen atom, an alkyl group of 1 to 6 carbon atoms, an aryl group, an aralkyl group, a cyano group, a fluorine atom, or a furyl group, and n is an integer of 1 to 300, preferably 1 to 150, more preferably 1 to 50.

As typical examples of the polyfunctional oxetane compound (a) to be used in the present invention, bisoxetanes represented by the following general formula (2) may be cited.

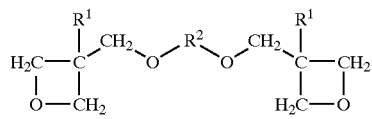

(2)

In the general formula (2) mentioned above, $R^1$ represents the same meaning as mentioned above, and $R^2$ represents a bivalent group selected from among linear or branched saturated hydrocarbons of 1 to 12 carbon atoms, linear or branched unsaturated hydrocarbons of 1 to 12 carbon atoms, aromatic hydrocarbons represented by the following formulas (A), (B), (C), (D), and (E), linear or cyclic alkylene groups containing a carbonyl group and represented by the following formulas (F) and (G), and aromatic hydrocarbons containing a carbonyl group and represented by the following formulas (H) and (I).

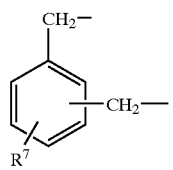

(A)

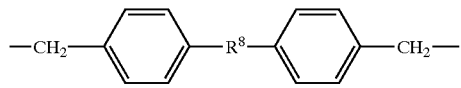

(B)

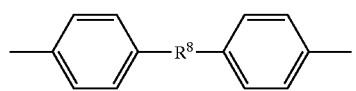

(C)

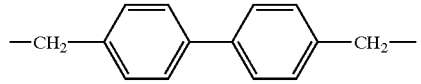

(D)

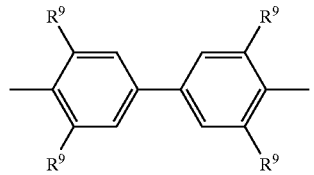

(E)

wherein $R^7$ represents a hydrogen atom, an alkyl group of 1 to 12 carbon atoms, an aryl group, or an aralkyl group, $R^8$ represents —O—, —S—, —$CH_2$—, —NH—, —$SO_2$—, —$CH(CH_3)$—, —$C(CH_3)_2$—, or —$C(CF_3)_2$—, and $R^9$ represents a hydrogen atom or an alkyl group of 1 to 6 carbon atoms.

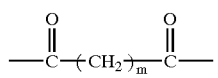

(F)

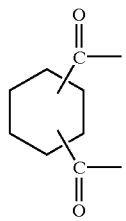

(G)

wherein m represents an integer of 1 to 12.

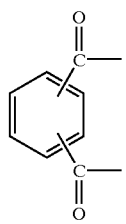

(H)

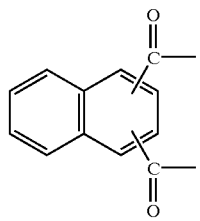

(I)

As typical examples of the trifunctional or more polyfunctional oxetane compound, the polyfunctional oxetane compounds as described hereinafter in relation to the component. (D) may be cited.

As typical examples of the polyfunctional carboxylic acid (b) to be used in the present invention, dicarboxylic acids represented by the following general formula (3) may be cited.

$$HOOC—R^3—COOH \qquad (3)$$

wherein $R^3$ represents the same meaning as mentioned above.

As concrete examples of the dicarboxylic acid, linear aliphatic dicarboxylic acids of 2 to 20 carbon atoms such as oxalic acid, malonic acid, succinic acid, glutaric acid, adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, nonadecanedioic acid, and eicosanedioic acid; branched aliphatic dicarboxylic acids of 3 to 20 carbon atoms such as methyl malonic acid, ethyl malonic acid, n-propyl malonic acid, butyl malonic acid, methyl succinic acid, ethyl succinic acid, and 1,1,3,5-tetramethyl octyl succinic acid; linear or branched aliphatic unsaturated dicarboxylic acids such as maleic acid, fumaric acid, citraconic acid, methyl citraconic acid, mesaconic acid, methyl mesaconic acid, itaconic acid, and glutaconic acid; hexahydrophthalic acid, hexahydroisophthalic acid, hexahydroterephthalic acid, cyclohexene-1,2-dicarboxylic acid, cyclohexene-1,6-dicarboxylic acid, cyclohexene-3,4-dicarboxylic acid, cyclohexene-4,5-dicarboxylic acid, and tetrahydrophthalic acids such as methyl hexahydrophthalic acid, methyl hexahydroisophthalic acid, and methyl hexahydroterephthalic acid represented by the following formula (J) may be cited.

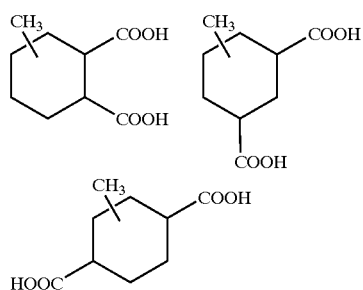

(J)

In addition thereto, tetrahydroisophthalic acids such as cyclohexene-1,3-dicarboxylic acid, cyclohexene-1,5-dicarboxylic acid, and cyclohexene-3,5-dicarboxylic acid; tetrahydroterephthalic acids such as cyclohexene-1,4-dicarboxylic acid and cyclohexene-3,6-dicarboxylic acid; dihydrophthalic acids such as 1,3-cyclohexadiene-1,2-dicarboxylic acid, 1,3-cyclohexadiene-1,6-dicarboxylic acid, 1,3-cyclohexadiene-2,3-dicarboxylic acid, 1,3-cyclohexadiene-5,6-dicarboxylic acid, 1,4-cyclohexadiene-1,2-dicarboxylic acid, and 1,4-cyclohexadiene-1,6-dicarboxylic acid; dihydroisophthalic acids such as 1,3-cyclohexadiene-1,3-dicarboxylic acid and 1,3-cyclohexadiene-3,5-dicarboxylic acid; dihydroterephthalic acids such as 1,3-cyclohexadiene-1,4-dicarboxylic acid, 1,3-cyclohexadiene-2,5-dicarboxylic acid, 1,4-cyclohexadiene-1,4-dicarboxylic acid, and 1,4-cyclohexadiene-3,6-dicarboxylic acid; and saturated or unsaturated alicyclic dicarboxylic acids such as methyl tetrahydrophthalic acid represented by the following formula (K), endomethylenetetrahydrophthalic acid, endo-cis-bicyclo[2.2.1]hepto-5-ene-2,3-dicarboxylic acid (product name: nadic acid), and methylendo-cis-bicyclo[2.2.1]hepto-5-ene-2,3-dicarboxylic acid (product name: methyl nadic acid) may also be cited.

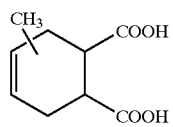

(K)

Furthermore, phthalic acid, isophthalic acid, terephthalic acid; 3-alkyl phthalic acids such as 3-methyl phthalic acid, 3-ethyl phthalic acid, 3-n-propyl phthalic acid, 3-sec-butyl phthalic acid, 3-isobutyl phthalic acid, and 3-tert-butyl phthalic acid; 2-alkyl isophthalic acids such as 2-methyl isophthalic acid, 2-ethyl isophthalic acid, 2-propyl isophthalic acid, 2-isopropyl isophthalic acid, 2-n-butyl isophthalic acid, 2-sec-butyl isophthalic acid, and 2-tert-butyl isophthalic acid; 4-alkyl isophthalic acids such as 4-methyl isophthalic acid, 4-ethyl isophthalic acid, 4-propyl isophthalic acid, 4-isopropyl isophthalic acid, 4-n-butyl isophthalic acid, 4-sec-butyl isophthalic acid, and 4-tert-butyl isophthalic acid; alkyl terephthalic acids such as methyl terephthalic acid, ethyl terephthalic acid, propyl terephthalic acid, isopropyl terephthalic acid, n-butyl terephthalic acid, sec-butyl terephthalic acid, and tert-butyl terephthalic acid; and aromatic dicarboxylic acids such as naphthalene-1,2-dicarboxylic acid, naphthalene-1,3-dicarboxylic acid, naphthalene-1,4-dicarboxylic acid, naphthalene-1,5-dicarboxylic acid, naphthalene-1,6-dicarboxylic acid, naphthalene-1,7-dicarboxylic acid, naphthalene-1,8-dicarboxylic acid, naphthalene-2,3-dicarboxylic acid, naphthalene-2,7-dicarboxylic acid, anthracene-1,3-dicarboxylic acid, anthracene-1,4-dicarboxylic acid, anthracene-1,5-dicarboxylic acid, anthracene-1,9-dicarboxylic acid, anthracene-2,3-dicarboxylic acid, and anthracene-9,10-dicarboxylic acid may be cited.

Further, in the present invention the dicarboxylic acids represented by the following general formula (L) may be used besides the dicarboxylic acids enumerated above.

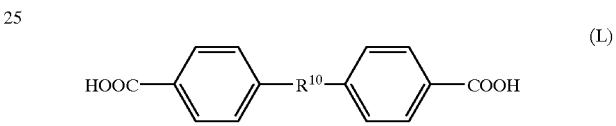

(L)

wherein $R^{10}$ represents —O—, —S—, —CH$_2$—, —NH—, —SO$_2$—, —CH(CH$_3$)—, —C(CH$_3$)$_2$—, or —C(CF$_3$)$_2$—.

As polyfunctional carboxylic acids of trifunctionality or more functionality, though any compounds may be used without any limitation, various tetracarboxylic acids and tricarboxylic acids such as trimesic acid and 1,2,3-propane tricarboxylic acid are preferable from the viewpoint of the reactivity to the polyfunctional oxetane compound.

As the unsaturated monocarboxylic acid (c) to be used in the present invention, any known compounds containing a polymerizable unsaturated group and a carboxylic group in combination in its molecule may be used. As concrete examples thereof, acrylic acid, methacrylic acid, cinnamic acid, crotonic acid, sorbic acid, α-cyanocinnamic acid, β-styryl acrylic acid, etc. may be cited. Alternatively, a half ester of a dibasic acid anhydride with a (meth)acrylate having a hydroxyl group may be used. As concrete examples, the half esters of the acid anhydride such as phthalic acid, tetrahydrophthalic acid, hexahydrophthalic acid, maleic acid, and succinic acid with the hydroxyl group-containing (meth)acrylate such as hydroxyethyl acrylate, hydroxyethyl methacrylate, hydroxypropyl acrylate, and hydroxypropyl methacrylate may be cited. These unsaturated monocarboxylic acids may be used either singly or in the form of a combination of two or more members. Incidentally, the term "(meth)acrylate" as used in the present specification refers collectively to acrylate and methacrylate. This holds good for other similar expression.

In the present invention, the ratio of the polyfunctional carboxylic acid (b) to the polyfunctional oxetane compound (a) (the charging ratio in the reaction mixture) is desired to be in the range of 0.1<(b)/(a)<1, more preferably in the range of 0.5<(b)/(a)<1, in a molar ratio. If the ratio mentioned above is not more than 0.1, the produced resin will have insufficient polyfunctional carboxylic acid skeletons introduced thereinto and thus the polyester resin having a desired molecular weight will not be obtained and, as a result, the resin fails to allow a coating film to have sufficient properties. Conversely, if the ratio mentioned above exceeds 1, the polymerization terminal in the polyaddition reaction becomes carboxyl group. As a result, the subsequent reaction of unsaturated monocarboxylic acid (c) will not take place and the introduction of polymerizable groups is attained only with difficulty.

In the present invention, the proportion of the unsaturated monocarboxylic acid (c) (the charging ratio in the reaction mixture) is desired to be in the approximate range of 0.1 to 3.0 mols, more preferably in the range of 0.3 to 5 mols, most preferably in the range of 0.5 to 1.0 mol, based on one mole of the oxetanyl group. If the amount of the unsaturated monocarboxylic acid per one mole of the oxetanyl group is lower that 0.1 mol, the compound will be at a disadvantage in acquiring insufficient polymerizable groups introduced into the polyaddition product and thus an unduly low photocuring properties. When the unsaturated monocarboxylic acid remains in the unreacted state, it may be removed by a well known method such as vacuum distillation and alkali cleaning.

The addition of the unsaturated monocarboxylic acid (c) to the reaction mixture may be carried out by either method of doing after completion of the polyaddition reaction of the polyfunctional oxetane compound (a) and the polyfunctional carboxylic acid (b) mentioned above or doing simultaneous addition of three components, the polyfunctional oxetane compound, the polyfunctional carboxylic acid, and the unsaturated monocarboxylic acid. From the viewpoint of workability, the simultaneous addition of three components is preferable.

As a reaction promotor to be used in the production of the unsaturated polyester compound of the present invention, any compound may be arbitrarily selected from among a tertiary amine, a tertiary amine salt, a quaternary onium salt, a tertiary phosphine, a crown ether complex, and a phosphonium ylide. These compounds may be used either singly or in the form of a combination of two or more members.

As the tertiary amine, triethylamine, tributylamine, DBU (1,8-diazabicyclo[5.4.0]undeca-7-ene), DBN (1,5-diazabicyclo[4.3.0]nona-5-ene), DABCO (1,4-diazabicyclo[2.2.2]octane), pyridine, N,N-dimethyl-4-amino pyridine, etc. may be cited.

As the tertiary amine salt, U-CAT series of Sun-Apro K.K., for example, may be cited.

As the quaternary onium salt, ammonium salts, phosphonium salts, arsonium salts, stibonium salts, oxonium salts, sulfonium salts, selenonium salts, stannonium salts, iodonium salts, etc. may be cited. Particularly preferable salts are ammonium salts and phosphonium salts. As concrete examples of the ammonium salts, tetra-n-butylammonium halides such as tetra-n-butylammonium chloride (TBAC), tetra-n-butylammonium bromide (TBAB), and tetra-n-butylammonium iodide (TBAI), and tetra-n-butylammonium acetate (TBAAc) may be cited. As concrete examples of the phosphonium salts, tetra-n-butylphosphonium halides such as tetra-n-butylphosphonium chloride (TBPC), tetra-n-butylphosphonium bromide (TBPB), and tetra-n-butylphosphonium iodide (TBBI), tetraphenylphosphonium halides such as tetraphenylphosphonium chloride (TPPC), tetraphenylphosphonium bromide (TPPB), and tetraphenylphosphonium iodide (TPPI), and ethyltriphenylphosphonium bromide (ETPPB), ethyltriphenylphosphonium acetate (ETPPAc), etc. may be cited.

As the tertiary phosphine, any trivalent organic phosphorus compounds containing an alkyl group of 1 to 12 carbon atoms or an aryl group may be used. As the concrete examples thereof, triethylphosphine, tributylphosphine, triphenylphosphine, etc. may be cited.

Further, a quaternary onium salt obtained by the addition reaction of a tertiary amine or a tertiary phosphine with a carboxylic acid or a highly acidic phenol may be used as the reaction promotor. They may be in the form of a quaternary salt before adding to the reaction system. Alternatively, they may be individually added to the reaction system so as to form the quaternary salt in the reaction system. As the concrete examples thereof, tributylamine acetic acid salt obtained from tributylamine and acetic acid and triphenylphosphine acetic acid salt formed from triphenylphosphine and acetic acid may be cited.

As concrete examples of the crown ether complex, complexes of crown ethers such as 12-crown-4, 15-crown-5, 18-crown-6, dibenzo-18-crown-6, 21-crown-7, and 24-crown-8 with alkali metal salts such as lithium chloride, lithium bromide, lithium iodide, sodium chloride, sodium bromide, sodium iodide, potassium chloride, potassium bromide, and potassium iodide may be cited.

Although any known compounds obtained by the reaction of a phosphonium salt and a base may be used as the phosphonium ylide, a highly stable compound is preferable from the viewpoint of easy handling. As concrete examples thereof, (formylmethylene)triphenylphosphine, (acetylmethylene)triphenylphosphine, (pivaloylmethylene) triphenylphosphine, (benzoylmethylene) triphenylphosphine, (p-methoxybenzoylmethylene) triphenylphosphine, (p-methylbenzoylmethylene) triphenylphosphine, (p-nitrobenzoylmethylene) triphenylphosphine, (naphthoyl)triphenylphosphine, (methoxycarbonyl)triphenylphosphine, (diacetylmethylene) triphenylphosphine, (acetylcyano)triphenylphosphine, (dicyanomethylene)triphenylphosphine, etc. may be cited.

The amount of the reaction promotor to be used is preferred to be in the approximate range of 0.1 to 25 mol %, more preferably 0.5 to 20 mol %, most preferably 1 to 15 mol %, based on one mol of the oxetanyl group. If the amount of the reaction promotor to be used is less than 0.1 mol % of the oxetanyl group, the reaction will not proceed at a practical reaction speed. Conversely, a large amount exceeding 25 mol % is not desirable from the economical viewpoint because a remarkable reaction promotion effect will not be obtained even when the promotor is present in such a large amount.

The reaction temperature in the production of the unsaturated polyester compound is preferred to be in the approximate range of 100 to 200° C., more preferably 120 to 160° C. If the reaction temperature is lower than 100° C., the reaction will not proceed to a satisfactory extent. Conversely, the reaction temperature exceeding 200° C. is not desirable from the reasons that the reaction products will tend to cause the thermal polymerization due to the reaction of the double bonds thereof and that the unsaturated monocarboxylic acid having a low boiling point will evaporate. Although the reaction time may be suitably selected depending on the reactivity of the raw materials to be used and the reaction temperature, the preferred reaction time is about 5 to about 72 hours.

Although the aforementioned reaction in the production of the unsaturated polyester compound of the present invention proceeds either in the presence of an organic solvent or in the absence of a solvent, the absence of the solvent is desirable from the viewpoint of the high speed of the reaction. Alternatively, the reaction may also be performed in the presence of a diluent for the purpose of improving the agitating effect during the reaction. Although the diluent to be used is not limited to a particular one insofar as it can keep the reaction temperature, the diluents which can dissolve the raw materials therein prove to be desirable. When an organic solvent is used as the diluent during the synthesis, the solvent may be removed by a well known method such as vacuum distillation. Furthermore, the production can be also carried out in the presence of a reactive diluent such as a reactive monomer to be described hereinafter.

As the organic solvent, any known organic solvents may be used insofar as they will not exert a harmful influence on the reaction and can keep the reaction temperature. As concrete examples thereof, alcohols such as diethylene glycol monomethyl ether, diethylene glycol monoethyl ether, dipropylene glycol monomethyl ether, and dipropylene glycol monobutyl ether; glycol esters such as ethylene glycol monomethyl ether acetate, diethylene glycol monomethyl ether acetate, diethylene glycol monoethyl ether acetate, propylene glycol monomethyl ether acetate, and dipropylene glycol monomethyl ether acetate; ethers such as diethylene glycol dimethyl ether and dipropylene glycol dimethyl ether; ketones such as methylisobutyl ketone and cyclohexanone; and aromatic hydrocarbons such as toluene and xylene may be cited.

Next, a method for the production of the actinic energy ray-curable resin (A) of the present invention will be described below.

The actinic energy ray-curable resin (A) to be used in the present invention is produced by causing 0.1 to 1.0 mol of a polybasic acid anhydride (d) to react with one chemical equivalent of hydroxymethyl group of the unsaturated polyester compound (A') having an ethylenically unsatureated group in its terminal and hydroxymethyl group in its side chain and produced as described above. Since the hydroxymethyl group caused by the addition reaction of the oxetane with the carboxylic acid is present in the unsaturated polyester compound (A') mentioned above and the carboxyl group is introduced into the resin by the addition reaction of this hydroxyl group with the polybasic acid anhydride, the resultant actinic energy ray-curable resin becomes soluble in an aqueous alkaline solution.

As concrete examples of the polybasic acid anhydrides (d), dibasic acid anhydrides such as phthalic anhydride, succinic anhydride, octenylphthalic anhydride, pentadodecenylsuccinic anhydride, maleic anhydride, tetrahydrophthalic anhydride, hexahydrophthalic anhydride, methyltetrahydrophthalic anhydride, 3,6-endomethylenetetrahydrophthalic anhydride, methylendomethylenetetrahydrophthalic anhydride, tetrabromophthalic anhydride, and trimellitic anhydride; and tetrabasic acid dianhydrides such as biphenyl-tertacarboxylic dianhydride, naphthalene-tertacarboxylic dianhydride, diphenyl ether-tertacarboxylic dianhydride, cyclopentane-tertacarboxylic dianhydride, pyromellitic anhydride, and benzophenone-tetracarboxylic dianhydride may be cited. These polybasic acid anhydrides may be used either singly or in the form of a mixture of two or more members.

The reaction of the above polybasic acid anhydride (d) with the unsaturated polyester compound (A') mentioned above may be performed at a temperature in the approximate range of 50 to 150° C., preferably 80 to 130° C. in a mixing ratio mentioned above. The amount of the polybasic acid anhydride to be used is preferred to be in the range of 0.1 to 1.0 mol per one chemical equivalent of the hydroxymethyl group of the unsaturated polyester compound (A') mentioned above. The amount of the polybasic acid anhydride lower than 0.1 mol is not preferable from the reason that the amount of the carboxyl groups introduced into the resin is too small and thus sufficient alkali-solubility is not imparted to the resin. Conversely, an unduly large amount exceeding 1.0 mol is not preferable because the unreacted unsaturated monocarboxylic acid remains in the resin and it will deteriorate the properties of the resin such as durability and electrical insulation properties.

In the reaction of the polybasic acid anhydride (d) with the unsaturated polyester compound (A') mentioned above, a reaction promotor such as a tertiary amine, a tertiary amine salt, a quaternary onium salt, a tertiary phosphine, a phosphonium ylide, a crown ether complex, and an adduct of a tertiary amine or a tertiary phosphine with a carboxylic acid or a highly acidic phenol may be used. The amount of the reaction promotor to be used is preferred to.be in the range of 0.1 to 25 mol %, preferably 0.5 to 20 mol %, most preferably 1 to 15 mol %, of the polybasic acid anhydride. If the catalyst used for the production of the unsaturated polyester compound (A') mentioned above still remains in the system, however, the reaction will be promoted even if the catalyst is not newly added.

Although the aforementioned reaction proceeds either in the presence of an organic solvent or in the absence of a solvent, the reaction may also be performed in the presence of the aforementioned diluent for the purpose of improving the agitating effect during the reaction.

In the aforementioned reaction, air blowing or the addition of a polymerization inhibitor may be done for the purpose of preventing the reaction mixture from gelation due to polymerization of the unsaturated double bonds. As the examples of the polymerization inhibitor, hydroquinone, toluquinone, methoxyphenol, phenothiazine, triphenyl antimony, copper chloride, etc. may be cited.

Then, the curable resin compositions of the present invention (photocurable and/or thermosetting compositions containing the unsaturated polyester compound (A') mentioned above and/or the actinic energy ray-curable resin (A) mentioned above, and actinic energy ray-curable resin compositions) will be described below.

First, by mixing one or a mixture of two or more of the unsaturated polyester compounds (A') of the present invention obtained as described above with a photo-radical polymerization initiator and/or a heat radical polymerization initiator as the polymerization initiator (B), a photocurable and/or thermosetting composition may be obtained.

Further, by mixing one or a mixture of two or more of the actinic energy ray-curable resins (A) of the present invention obtained as described above with a photo-radical polymerization initiator as the photopolymerization initiator (B), a photocurable composition may be obtained.

Moreover, by adding a reactive monomer to be described hereinafter as the diluent (C) to these compositions, it is possible to improve the photocuring properties thereof. Incidentally, the amount of the unsaturated polyester compound (A') or the actinic energy ray-curable resin (A) to be incorporated in the curable composition of the present invention is not limited to a particular range.

Furthermore, the actinic energy ray-curable resin composition (photocurable and thermosetting resin composition) obtained by mixing the actinic energy ray-curable resin (A) mentioned above with a photopolymerization initiator (B), a diluent (C) and a compound containing at least two oxirane groups and/or oxetanyl groups in its molecule is capable of forming an image by subjecting its coating film to exposure to light and development and allows formation of a cured film excelling in various properties such as resistance to heat, adhesiveness, electrical insulation properties, resistance to chemicals, and resistance to cracks by the heating of the coating film after development, without causing any shrinkage on curing.

As the photo-radical polymerization initiator to be used as the polymerization initiator (B), any known compounds which generate radicals by irradiation of an actinic energy ray may be used. As concrete examples thereof, benzoin and alkyl ethers thereof such as benzoin, benzoin methyl ether, and benzoin ethyl ether; acetophenones such as acetophenone, 2,2-dimethoxy-2-phenyl acetophenone and 4-(1-t-butyldioxy-1-methylethyl)acetophenone; anthraquinones such as 2-methylanthraquinone, 2-amylanthraquinone, 2-t-butyl anthraquinone, and 1-chloroanthraquinone; thioxanthones such as 2,4-dimethylthioxanthone, 2,4-diisopropylthioxanthone, and 2-chlorothioxanthone; ketals such as acetophenone dimethyl ketal and benzyl dimethyl ketal; benzophenones such as benzophenone, 4-(1-t-butyldioxy-1-methylethyl) benzophenone, and 3,3',4,4'-tetrakis(t-butyldioxycarbonyl) benzophenone; aminoacetophenones such as 2-methylthio-1-[4-(methylthio)phenyl]-2-morpholino-propane-1-one and 2-benzyl-2-dimethylamino-1-(4-morpholinophenyl)-butane-1-one; alkylphosphines such as 2,4,6-trimethylbenzoyl phosphine oxide; and acryzines such as 9-phenyl acryzine may be cited.

These photo-radical polymerization initiators may be used either singly or in the form of a combination of two or more members. The amount of the photo-radical polymerization initiator to be used is preferred to be in the range of from 0.1 to 30 parts by weight, based on 100 parts by weight of the unsaturated polyester compound (A') or the actinic energy ray-curable resin (A) mentioned above. If the amount of the photo-radical polymerization initiator to be used is less than the lower limit of the range mentioned above, the composition will not be photocured by irradiation of an actinic energy ray or the irradiation time should be prolonged, and a coating film of satisfactory properties will be obtained only with difficulty. Conversely, even if the photo-radical polymerization initiator is added to the composition in a large amount exceeding the upper limit of the range mentioned above, the composition will not attain the further improvement in the curing properties and such a large amount is not desirable from the economical viewpoint.

In the curable composition and the actinic energy ray-curable resin composition of the present invention, for the purpose of improving the curing with an actinic energy ray, a curing promotor and/or sensitizer may be used in combination with the photo-radical polymerization initiator mentioned above. As the curing promotors which are usable herein, tertiary amines such as triethylamine, triethanolamine, 2-dimethylaminoethanol, N,N-(dimethylamino)ethyl benzoate, N,N-(dimethylamino) isoamyl benzoate, and pentyl-4-dimethylamino benzoate; and thioethers such as β-thiodiglycol may be cited. As the sensitizer, sensitizing dyestuff such as (keto)cumalin and thioxantene; and alkyl borates of such dyestuff as cyanine, rhodamine, safranine, malachite green, and methylene blue may be cited. These curing promotors and/or sensitizers may be used independently either singly or in the form of a combination of two or more members. The amount of the curing promotors and/or sensitizers to be used is preferred to be in the range of from 0.1 to 30 parts by weight, based on 100 parts by weight of the unsaturated polyester compound (A') or the actinic energy ray-curable resin (A) mentioned above.

As the heat radical polymerization initiators which are usable in the present invention, organic peroxides such as benzoyl peroxide, acetyl peroxide, methyl ethyl ketone peroxide, lauroyl peroxide, dicumyl peroxide, di-t-butyl peroxide, t-butyl hydroperoxide, and cumene hydroperoxide; and azo type initiators such as 2,2'-azobisisobutyronitrile, 2,2'-azobis-2-methylbutyronitrile, 2,2'-azobis-2,4-divaleronitrile, 1,1'-azobis(1-acetoxy-1-phenylethane), 1'-azobis-1-cyclohexane carbonitrile, dimethyl-2,2'-azobisisobutylate, 4,4'-azobis-4-cyanovalic acid, and 2-methyl-2,2'-azobispropanenitrile may be cited. As the preferred initiator, 1,1-azobis(1-acetoxy-1-phenylethane) of the non-cyane and non-halogen type is cited. The heat radical polymerization initiator may be used in the range of 0.1 to 10 parts by weight, preferably 0.5 to 5 parts by weight, based on 100 parts by weight of the unsaturated polyester compound (A') mentioned above.

When an organic peroxide which exhibits a lower curing rate is used as the heat radical polymerization initiator, tertiary amines such as tributylamine, triethylamine, dimethyl-p-toluidine, dimethylaniline, triethanolamine, and diethanolamine, or metallic soap such as cobalt naphthenate, cobalt octoate, and manganous naphthenate may be used as a promotor.

The curable composition and the actinic energy ray-curable resin composition of the present invention may incorporate a diluent (C) therein. The diluent (C) may be added during the synthesis of the unsaturated polyester compound (A') or the actinic energy ray-curable resin (A) mentioned above or after the synthesis. As the diluent (C), a reactive diluent can be advantageously used besides an organic solvent as enumerated hereinbefore.

As the reactive diluent, any known compounds having a polymerizable group which is capable of taking part in the curing rection may be advantageously used. For example, any known reactive diluents such as monofunctional (meth) acrylates and/or polyfunctional (meth)acrvlates can be used. As concrete examples thereof, methyl (meth)acrylate, ethyl (meth)acrylate, n-propyl (meth)acrylate, isopropyl (meth) acrylate, n-butyl (meth)acrylate, isobutyl (metha)crylate, 2-ethylhexyl (meth)acrylate, isodecyl (meth)acrylate, lauryl (meth)acrylate, tridecyl (meth)acrylate, stearyl (meth) acrylate, methoxypolyethylene glycol (meth)acrylate, cyclohexyl (meth)acrylate, tetrahydrofurfuryl (meth)acrylate, isobornyl (meth)acrylate, benzyl (meth)acrylate, 2-hydroxyethyl (meth)acrylate, 2-hydroxypropyl (meth) acrylate, 2-hydroxybutyl (meth)acrylate, dimethylaminoethyl (meth)acrylate, ethylene glycol di(meth)acrylate, diethylene qlycol di(meth)acrylate, 1,4-butanediol di(meth) acrylate, 1,6-hexanediol di(meth)acrylate, trimethylol propane tri(meth)acrylate, glycerin di(meth)acrylate, pentaerythritol di(meth)acrylate, pentaerythritol tetra(meth) acrylate, dipentaerythritol hexa(meth)acrylate, polyester acrylate, reaction products of a dibasic acid anhydride with an alcohol having one or more unsaturated groups in its molecule, etc. may be cited. Further, it is also possible to add the organic solvent as mentioned above to the composition as the diluent for the purpose of adjusting the viscosity of the composition. The diluents (c) can be used either singly or in the form of a mixture of two or more members and the amount thereof is not limited to a particular range.

The compound containing at least two oxirane groups and/or oxetanyl groups in its molecule (D) mentioned above is a polyfunctional epoxy compound (D-1) and/or a polyfunctional oxetane compound (D-2).

As the polyfunctional epoxy compound (D-1), any known and widely used epoxy resins, for example, novolak type epoxy resins (such as, for example, those which are obtained by causing such phenols as phenol, cresol, halogenated phenols, and alkyl phenols to react with formaldehyde in the presence of an acidic catalyst and then causing the resultant novolaks to react with epichlorohydrin and/or methyl epichlorohydrin and which include such commercially available substances as EOCN-103, EOCN-104S, EOCN-1020, EOCN-1027, EPPN-201, and BREN-S produced by Nippon Kayaku Co., Ltd., DEN-431 and DEN-438 produced by The Dow Chemical Company, N-730, N-770, N-865, N-665, N-673, N-695, and VH-4150 produced by Dainippon Ink and Chemicals, Inc.), bisphenol type epoxy resins (such as, for example, those which are obtained by causing such bisphenols as bisphenol A, bisphenol F, bisphenol S, and tetrabromobisphenol A to react with epichlorohydrin and/or methyl epichlorohydrin and which include such commercially available substances as EPIKOTE 1004 and EPIKOTE 1002 produced by Japan Epoxy Resin K.K. and DER-330 and DER-337 produced by The Dow Chemical Company), trisphenol methane type epoxy resins (such as, for example, those which are obtained by causing trisphenol methane or triscresol methane to react with epichlorohydrin and/or methyl epichlorohydrin and which include such commercially available substances as EPPN-501 and EPPN-502 produced by Nippon Kayaku Co., Ltd.), tris(2,3-epoxypropyl)isocyanurate, biphenol diglycidyl ether, and other epoxy resins such as alicyclic epoxy resins, amino group-containing epoxy resins, copolymer type epoxy resins, cardo type epoxy resins, and calixarene type epoxy resins may be used either singly or in the form of a combination of two or more members.

As the typical examples of the polyfunctional oxetane compounds (D-2) to be used in the present invention, the compounds containing three or more oxetane rings in their molecules may be used besides the compounds containing two oxetane rings in their molecules as enumerated hereinbefore, such as bisoxetanes represented by the general formula (1) mentioned above.

As typical examples of the compounds containing three or more oxetane rings in their molecules, etherified products of an oxetane with a hydroxyl group-containing resin such as a novolak resin, poly(p-hydroxy styrene), cardo type bisphenols, calixresorcinarenes, or a cylseski oxane besides the compounds represented by the following general formula (4) may be cited. In addition thereto, a copolymer of an unsaturated monomer containing an oxetane ring therein and an alkyl (meth)acrylate may be cited.

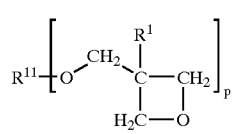

(4)

In the general formula (4) mentioned above, $R^1$ represents the same meaning as mentioned above, $R^{11}$ represents a residue of the hydroxyl group-containing resin of the etherified product mentioned above, a branched alkylene group of 1 to 12 carbon atoms represented by the following formula (M), (N) or (O), or an aromatic hydrocarbon represented by the following formula (P), (Q) or (R), and "p" represents the number of functional groups bonded to the residue $R^{11}$, an integer of three or more, preferably an integer of 3 to 5,000.

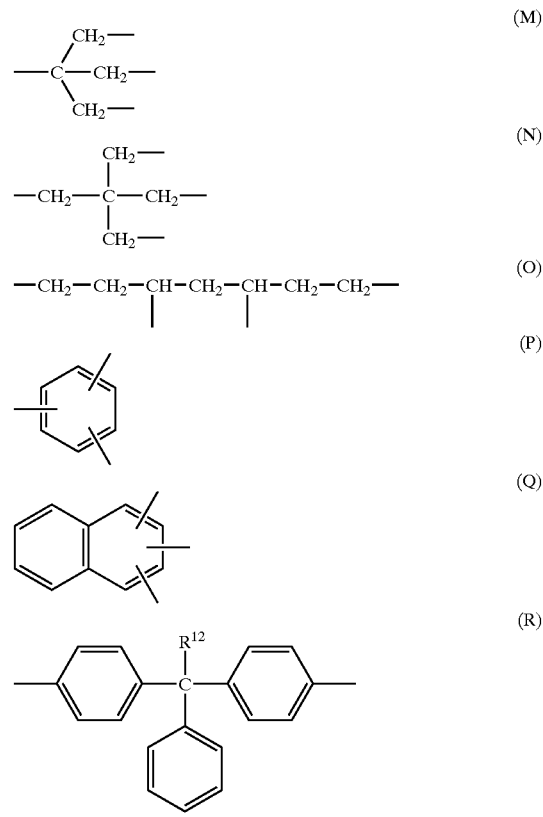

wherein $R^{12}$ represents a hydrogen atom, an alkyl group of 1 to 6 carbon atoms, or an aryl group.

The polyfunctional oxetane compounds (D) mentioned above may be used either singly or in the form of a combination of two or more members.

The amount of the polyfunctional epoxy compound or polyfunctional oxetane compound (D) mentioned above to be incorporated in the composition is desired to be in the range of 5 to 100 parts by weight, preferably 15 to 60 parts by weight, based on 100 parts by weight of the actinic energy ray-curable resin (A) mentioned above.

Further, for the purpose of promoting the thermal curing reaction, a small amount of a well-known curing promotor such as tertiary amines, quaternary onium salts, tertiary phosphines, crown ether complex, imidazole derivatives and dicyandiamide may be used in combination therewith. The curing promotor may be arbitrarily selected from among these compounds and may be used either singly or in the form of a combination of two or more members. Besides, other known curing promotors such as a phosphonium ylide may be used.

As the imidazole derivatives, imidazole, 2-methylimidazole, 2-ethylimidazole, 2-ethyl-4-methylimidazole, 2-phenylimidazole, 4-phenylimidazole, 1-cyanoethyl-2-phenylimidazole, 1-(2-cyanoethyl)-2-ethyl-4-methylimidazole, etc. may be cited. The compounds which are commercially available include products of Shikoku Chemicals Co., Ltd., 2MZ-A, 2MZ-OK, 2PHZ, 2P4BHZ, and 2P4 MHZ. As the compounds which can improve the stability with time, the products of Asahi-Ciba Co., Ltd., Novacure HX-3721, HX-3748, HX-3741, HX-3088, HX-3722, HX-3742, HX-3921HP, HX-3941HP, HX-3613, etc. may be cited.

The amount of the curing promotor to be used is preferred to be in the range of 0.1 to 25 mol %, more preferably 0.5 to 20 mol %, most preferably 1 to 15 mol %, based on one mol of the oxirane group or oxetanyl group. If the amount of the curing promotor to be used is less than 0.1 mol % of the oxirane/oxetanyl group, the reaction will not proceed at a practical reaction speed. Conversely, a large amount exceeding 25 mol % is not desirable from the economical viewpoint because a remarkable reaction promotion effect will not be obtained even when the promotor is present in such a large amount.

The curable composition and the actinic energy ray-curable resin composition of the present invention may further incorporate therein, as desired, a well-known and widely used filler such as bariumsulfate, silica, talc, clay, and calcium carbonate, a well-known and widely used coloring pigment such as phthalocyanine blue, phthalocyanine green, titanium oxide, and carbon black, and various additives such as an anti-foaming agent, an adhesiveness-imparting agent, and a leveling agent.

The curable composition or the actinic energy ray-curable resin composition obtained as described above is adjusted, when necessary, to a level of viscosity suitable for a coating method by addition of a diluent, then applied to a substrate by a suitable coating method such as a screen printing method, a curtain coating method, a roll coating method, a dip coating method, and a spin coating method, and predried at a temperature in the approximate range of 60 to 120° C., for example, thereby to evaporate the organic solvent from the composition and give rise to a coating film. Thereafter, a cured film can be obtained by subjecting the coating film to irradiation with an actinic energy ray and/or heating in the case of a curable composition containing the unsaturated polyester compound (A') or to irradiation with an actinic energy ray in the case of a curable composition containing the actinic energy ray-curable resin (A).

On the other hand, in the case of the actinic energy ray-curable resin composition, a resist pattern can be formed by selectively irradiating the coating film formed in the manner mentioned above with an actinic energy ray through a photomask having a prescribed exposure pattern and developing the unexposed areas of the coating film with an aqueous alkaline solution. When the film is further thermally cured by subjecting to the heat treatment at a temperature in the approximate range of 140 to 200° C., it is possible to form a cured film excelling in various properties such as adhesiveness, resistance to soldering heat, resistance to chemicals, electrical insulation properties, and resistance to electrolytic corrosion. Furthermore, it is possible to further improve the various properties of the cured film by effecting the post UV curing before or after the thermal curing.

As an aqueous alkaline solution to be used in the process of development mentioned above, aqueous solutions of sodium hydroxide, potassium hydroxide, sodium carbonate, potassium carbonate, sodium silicate, ammonia, organic amines, tetramethylammonium hydroxide, etc. can be used. The concentration of an alkali in the developing solution may be proper generally in the range of 0.1 to 5.0 wt. %. As the developing method, various known methods such as dipping development, paddling development, and spraying development may be adopted.

The sources for irradiation of an actinic energy ray which are properly used for the purpose of curing the curable composition and the actinic energy ray-curable resin composition mentioned above include a low-pressure mercury lamp, a medium-pressure mercury lamp, a high-pressure mercury lamp, an ultra-high-pressure mercury lamp, a xenon lamp, and a metal halide lamp, for example. Laser beams may also be utilized as the actinic ray for exposure. Further, electron beams, α-rays, β-rays, γ-rays, X-rays, neutron beams, etc. may be utilized.

Now, the present invention will be described more specifically below with reference to working examples and a comparative example. It should be noted, however, that the following Examples are intended to be merely illustrative of and in any sense restrictive of the present invention. Wherever the terms "parts" and "%" are used hereinbelow, they invariably refer to those based on weight unless otherwise specified.

SYNTHESIS EXAMPLE 1

Into a 100 ml four-necked flask equipped with a stirrer, a thermometer, and a reflux condenser, 18.1 g of terephthalate bisoxetane (manufactured by Ube Kosan K.K.), 2.5 g of isophthalic acid, 4.3 g of methacrylic acid, 1.0 g of tetraphenylphosphonium bromide, 0.05 g of methoquinone, and 20 g of propylene glycol monomethyl ether acetate were charged and stirred at 140° C. for 12 hours to obtain a resinous solution containing 55% of an unsaturated polyester compound. The completion of the reaction was judged by confirming the consumption of all monomer components by the GPC (gel permeation chromatography). The structure of the resultant compound was confirmed by the IR spectrum and $^1$H-NMR. The weight-average molecular weight of the compound determined by the GPC was 2,500. Hereinafter, this resin will be referred to as "Resin-A". The IR spectrum of the resin obtained is shown in the FIG. 1.

SYNTHESIS EXAMPLE 2

The synthesis was carried out by following the procedure of Synthesis Example 1, except that the amount of isophthalic acid charged was changed to 7.1 g and the amount of methacrylic acid charged was changed to 1.5 g, to obtain a resinous solution containing 55% of an unsaturated polyester compound having the weight-average molecular weight of 4,200. The structure of the resultant compound was confirmed by the IR spectrum and $^1$H-NMR. The weight-average molecular weight of the compound determined by the GPC was 4,200. Hereinafter, this resin will be referred to as "Resin-B".

SYNTHESIS EXAMPLE 3

Into a 100 ml four-necked flask equipped with a stirrer, a thermometer, and a reflux condenser, 10.7 g of bis(3-ethyl-3-oxetanyl)ether (manufactured by Ube Kosan K.K.), 5.5 g of adipic acid, 1.0 g of tetraphenylphosphonium bromide, and 20 g of N-methylpyrrolidone were charged and stirred at 140° C. for 12 hours to effect polyaddition reaction. 2.2 g of methacrylic acid and 0.1 g of methoquinone were added to the reaction solution and they were further stirred at 140° C. for 12 hours. The resultant reaction mixture was poured into a large amount of water and the precipitate was dried at reduced pressure to obtain 8.5 g of an unsaturated polyester compound. The structure of the resultant compound was confirmed by the IR spectrum and $^1$H-NMR. The weight-average molecular weight of the compound determined by the GPC was 2,100. Hereinafter, this resin will be referred to as "Resin-C".

SYNTHESIS EXAMPLE 4

Into a 100 ml four-necked flask equipped with a stirrer, a thermometer, and a reflux condenser, 9.6 g of 4,4'-bis(3-ethyl-3-oxetanyl)biphenol, 3.2 g of terephthalic acid, 1.0 g of tetraphenylphosphonium bromide, and 20 g of N-methylpyrrolidone were charged and stirred at 140° C. for 12 hours to effect polyaddition reaction. 2.2 g of methacrylic acid and 0.05 g of methoquinone were added to the reaction solution and they were further stirred at 140° C. for 12 hours. The resultant reaction mixture was poured into a large amount of methanol and the precipitate was dried at reduced pressure to obtain 9.7 g of an unsaturated polyester compound. The structure of the resultant compound was confirmed by the IR spectrum and $^1$H-NMR. The weight-average molecular weight of the compound determined by the GPC was 9,000. Hereinafter, this resin will be referred to as "Resin-D".

SYNTHESIS EXAMPLE 5

The synthesis was carried out by following the procedure of Synthesis Example 4, except that the dicarboxylic acid was changed to isophthalic acid, to obtain 10.6 g of an unsaturated polyester compound. The structure of the resultant compound was confirmed by the IR spectrum and $^1$H-NMR. The weight-average molecular weight of the compound determined by the GPC was 8,000. Hereinafter, this resin will be referred to as "Resin-E".

SYNTHESIS EXAMPLE 6

The synthesis was carried out by following the procedure of Synthesis Example 4, except that the dicarboxylic acid was changed to 4.6 g of 4,4'-diphenyl ether dicarboxylic acid, to obtain 12.4 g of an unsaturated polyester compound. The structure of the resultant compound was confirmed by the IR spectrum and $^1$H-NMR. The weight-average molecular weight of the compound determined by the GPC was 7,000.

The raw materials used in the following working examples and a comparative example are shown in Table 1.

TABLE 1

| Components | Chemical name or product name |
|---|---|
| Actinic energy ray-curable resin | Resin-A obtained in Synthesis Example 1<br>Resin-B obtained in Synthesis Example 2<br>Resin-C obtained in Synthesis Example 3<br>Resin-D obtained in Synthesis Example 4<br>Resin-E obtained in Synthesis Example 5<br>Epoxy acrylate (product obtained by acrylating EPIKOTE 1001 (manufactured by Japan Epoxy Resin K.K.)) |
| Photopolymerization initiator | Irgacure-184 (photopolymerization initiator manufactured by Ciba Specialty Chemicals Inc.) |
| Sensitizer | 2-Ethylanthraquinone |
| Reactive Diluent | Hydroxyethyl methacrylate (HEMA)<br>Pentaerythritol triacrylate (PE-3A) |
| Silicone-based anti-foaming agent | KS-66 (manufactured by Shin-Etsu Chemical Industries Co., Ltd.) |

EXAMPLES 1–5 AND COMPARATIVE EXAMPLE

The components were mixed at proportions shown in Table 2 and kneaded with a three-roll mill to prepare a curable composition, which was tested for the following properties.

TABLE 2

| Components and amounts (parts) | | Examples | | | | | Comp. Example |
|---|---|---|---|---|---|---|---|
| | | 1 | 2 | 3 | 4 | 5 | |
| Actinic energy ray-curable resin | Resin-A | 100 | — | — | — | — | — |
| | Resin-B | — | 100 | — | — | — | — |
| | Resin-C | — | — | 100 | — | — | — |
| | Resin-D | — | — | — | 100 | — | — |
| | Resin-E | — | — | — | — | 100 | — |
| | Epoxy acrylate | — | — | — | — | — | 100 |
| Photopolymerization initiator | | 5 | 5 | 5 | 10 | 10 | 5 |
| Sensitizer | | — | — | — | 1 | 1 | — |
| Reactive diluent | HEMA | — | — | — | 100 | 100 | — |
| | PE-3A | 10 | 10 | 10 | — | — | — |
| Silicone-based anti-foaming agent | | 1 | 1 | 1 | 1 | 1 | 1 |

(1) Photocuring Properties

A curable composition was applied to a copper foil by means of a bar coater in a film thickness of 10 μm and then exposed to light by means of a high-pressure mercury lamp to measure the time required for obtaining a tack-free coating film.

(2) Conversion of Double Bonds

A curable composition was applied to a KBr-coated plate in a film thickness of 10 μm, exposed to light by means of a high-pressure mercury lamp for 120 seconds, and then subjected to measurement of the degree of conversion of double bonds by means of the IR spectrum.

(3) Solvent Resistance

A curable composition was applied to a copper foil in a film thickness of 10 μm and then exposed to light by means of a high-pressure mercury lamp for 120 seconds to form a cured film. This film was rubbed with an absorbent wadding impregnated with acetone and visually examined to find the rubbing times required for the appearance of clouding in the film surface.

(4) Adhesiveness

A curable composition was applied to a copper foil in a film thickness of 10 μm and then exposed to light by means of a high-pressure mercury lamp for 120 seconds to form a cured film. This film was incised like cross-cut in the shape of squares and then subjected to a peeling test with a cellophane adhesive tape to visually examine the degree of separation of the film. The criterion for evaluation is as follows:

○: 100/100 and perfect absence of any discernible change

Δ: 50/100–90/100

X: 0/100–50/100

(5) Flexing Resistance

A curable composition was applied to a polyimide film to form a coating film of 10 μm thickness and then exposed to light by means of a high-pressure mercury lamp for 120 seconds to prepare a test sample. This test sample was folded 1800 over itself to visually evaluate the presence or absence of cracks in the sample.

○: Absence of crack in the sample

Δ: Presence of slight cracks in the sample

X: Presence of cracks in the entire surface of the sample

The results of the above tests are collectively shown in Table 3.

TABLE 3

| Properties | Examples | | | | |
|---|---|---|---|---|---|
| | 1 | 2 | 3 | 4 | 5 |
| Photocuring properties (second) | 80 | 90 | 70 | 150 | 150 |

TABLE 3-continued

| Properties | Examples | | | | |
|---|---|---|---|---|---|
| | 1 | 2 | 3 | 4 | 5 |
| Conversion (%) | 70 | 65 | 80 | 48 | 55 |
| Solvent resistance (times) | 50 | 10 | 10 | 10 | 10 |
| Adhesiveness | Δ | ○ | ○ | ○ | ○ |
| Flexing resistance | ○ | ○ | ○ | ○ | ○ |

As being clear from the results shown in Table 3, it has been confirmed that the curable compositions of the present invention obtained in Examples 1–5 had sufficient photocuring properties and solvent resistance. The composition of the comparative example sxhibited remarkable separation in the adhesiveness test and caused many cracks in the flexing resistance test. With respect to these properties, as being clear from the results shown in Table 3, the curable compositions of the present invention give cured products excelling in adhesiveness and flexing resistance.

SYNTHESIS EXAMPLE 7

Figure 2:
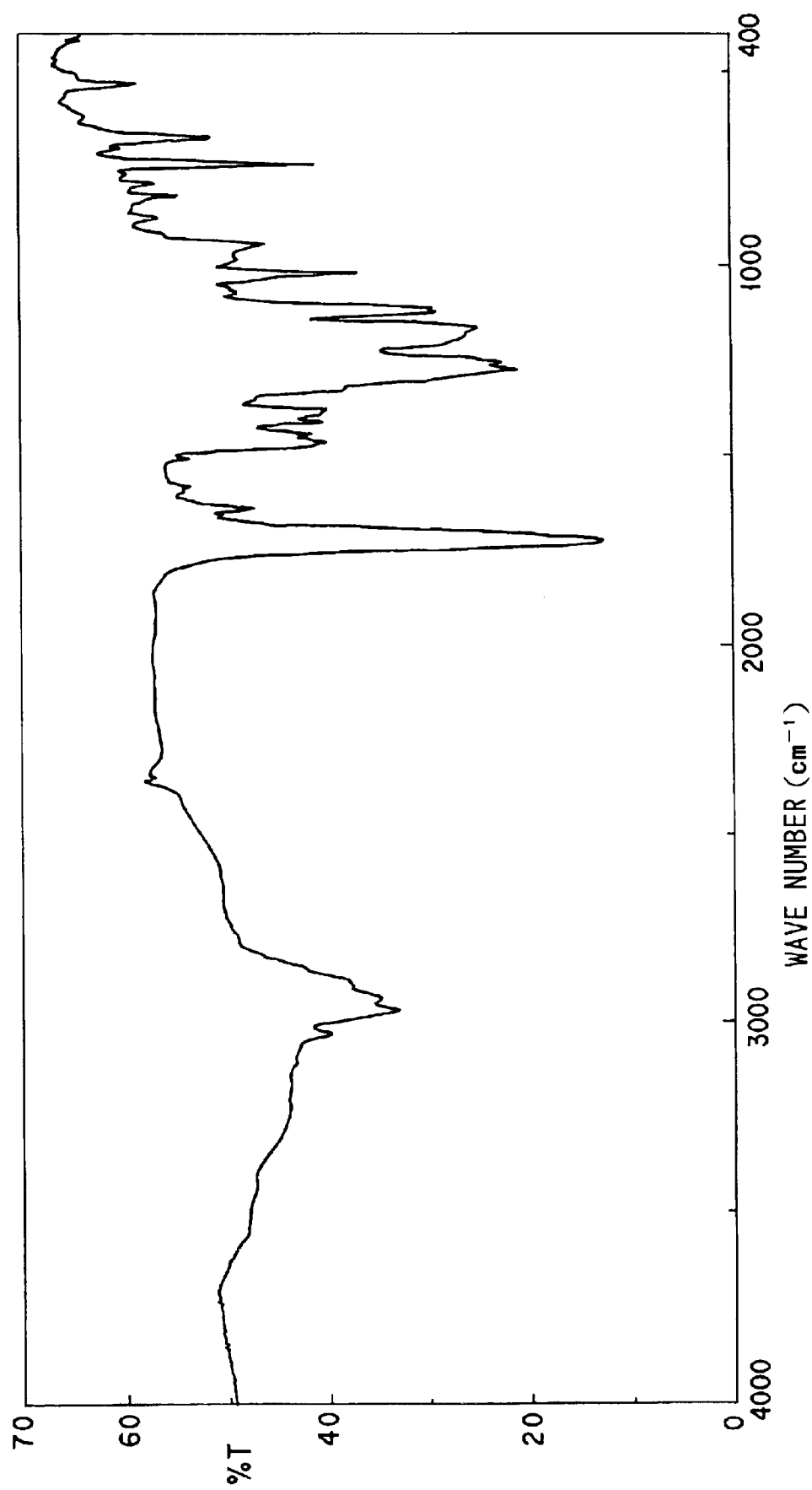
FIG. 2 shows the IR spectrum of the resin produced in Synthesis Example 7.

Into a 100 ml four-necked flask equipped with a stirrer, a thermometer, and a reflux condenser, 18.1 g of terephthalate bisoxetane (manufactured by Ube Kosan K.K.), 2.5 g of isophthalic acid, 4.3 g of methacrylic acid, 1.0 g of tetraphenylphosphonium bromide, 0.05 g of methoquinone, and 20 g of propylene glycol monomethyl ether acetate were charged and stirred at 140° C. for 12 hours. After the consumption of all monomer components has been confirmed by the GPC, 7.6 g of tetrahydrophthalic anhydride was added to the mixture. The mixture was further stirred at 80° C. for 3 hours. When it has been confirmed by the IR spectrum that the absorption originated from the acid anhydride disappeared and the absorption originated from the carboxyl group appeared, it was judged that the reaction has completed. The structure of the resultant resin was confirmed by the IR spectrum and $^1$H-NMR. The resultant resin was soluble in an aqueous 1% sodium carbonate solution. The weight-average molecular weight of the resin determined by the GPC was 3,500. Hereinafter, this resin solution will be referred to as "varnish A". The IR spectrum of the resin obtained is shown in FIG. 2.

SYNTHESIS EXAMPLE 8

The synthesis was carried out by following the procedure of Synthesis Example 7, except that the amount of isophthalic acid charged was changed to 7.1 g and the amount of methacrylic acid charged was changed to 1.5 g, to obtain a resinous solution containing 55% of an actinic energy ray-curable resin. The structure of the resultant resin was confirmed by the IR spectrum and $^1$H-NMR. The weight-average molecular weight of the resin determined by the GPC was 5,200. Hereinafter, this resin solution will be referred to as "varnish B".

SYNTHESIS EXAMPLE 9

Figure 3:
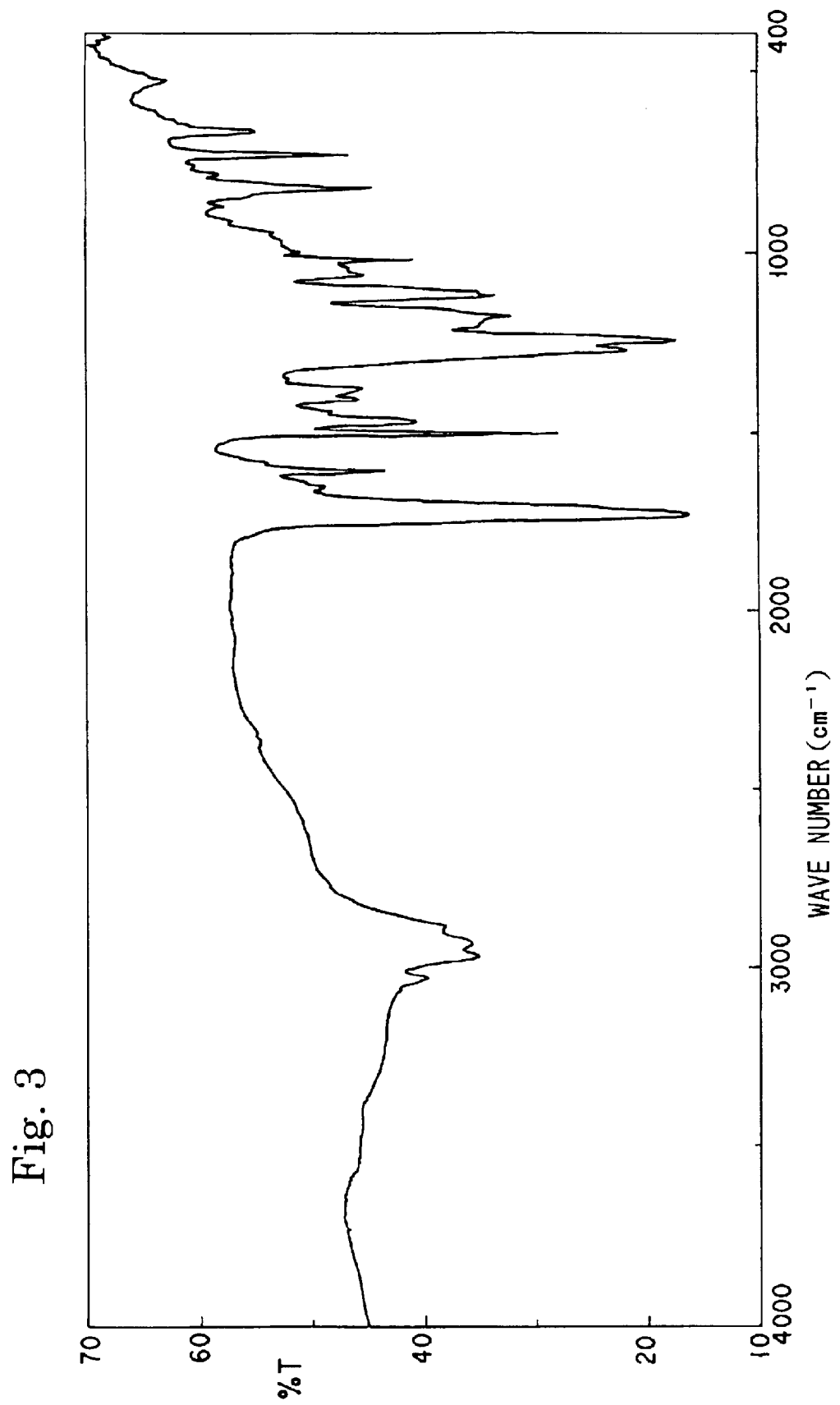
FIG. 3 shows the IR spectrum of the resin produced in Synthesis Example 9.

Into a 100 ml four-necked flask equipped with a stirrer, a thermometer, and a reflux condenser, 9.6 g of 4,4'-bis(3-ethyl-3-oxetanyl)biphenol, 3.2 g of terephthalic acid, 1.0 g of tetraphenylphosphonium bromide, and 20 g of N-methylpyrrolidone were charged and stirred at 140° C. for 12 hours to effect polyaddition reaction. 2.2 g of methacrylic acid and 0.05 g of methoquinone were added to the reaction solution and they were further stirred at 140° C. for 12 hours. The resultant reaction mixture was poured into a large amount of methanol and the precipitate was dried at reduced pressure to obtain 9.7 g of a resin of an intermediate product. 8.3 g of the resin obtained was dissolved in 8.3 g of propylene glycol monomethyl ether acetate, then 3.7 g of tetrahydrophthalic anhydride and 0.07 g of triphenylphosphine were added to the mixture and the mixture was further stirred at 80° C. for 5 hours. The end point of the reaction was confirmed by the IR spectrum. As a result, a resinous solution containing 59% of an actinic energy ray-curable resin was obtained. The structure of the resultant resin was confirmed by the IR spectrum and $^1$H-NMR. The weight-average molecular weight of the resin determined by the GPC was 10,000. The resultant resin was soluble in an aqueous 3% sodium carbonate solution. Hereinafter, this resin solution will be referred to as "varnish C". The IR spectrum of the resin obtained is shown in FIG. 3.

SYNTHESIS EXAMPLE 10

The synthesis was carried out by following the procedure of Synthesis Example 9, except that the dicarboxylic acid was changed to isophthalic acid, to obtain 10.6 g of a resin of an intermediate product. 8.3 g of the resin obtained was dissolved in 8.3 g of propylene glycol monomethyl ether acetate, then 3. 7 g of tetrahydrophthalic anhydride and 0. 07 g of triphenylphosphine were added to the mixture and the mixture was further stirred at 80° C. f or 5 hours. The end point of the reaction was confirmed by the IR spectrum. As a result, a resinous solution containing 59% of an actinic energy ray-curable resin was obtained. The structure of the resultant resin was confirmed by the IR spectrum and $^1$H-NMR. The weight-average molecular weight of the resin determined by the GPC was 10,000. The resultant resin was soluble in an aqueous 3% sodium carbonate solution. Hereinafter, this resin solution will be referred to as "varnish D".

The raw materials used in the following working examples are shown in Table 4.

TABLE 4

| Components | Chemical name or product name |
|---|---|
| Photosensitive prepolymer | Varnish-A obtained in Synthesis Example 7 |
| | Varnish-B obtained in Synthesis Example 8 |
| | Varnish-C obtained in Synthesis Example 9 |
| | Varnish-D obtained in Synthesis Example 10 |
| Reactive Diluent | Dipentaerythritol hexaacrylate |
| Photopolymerization initiator | 2-Methyl-1-[4-(methylthio)phenyl]-2-morphorino-propan-1-one |
| Coloring pigment | Phthalocyanine green |
| Silicone-based anti-foaming agent | KS-66 (manufactured by Shin-Etsu Chemical Industries Co., Ltd.) |
| Epoxy resin | TEPIC (manufactured by Nissan Chemical Industries Ltd.) |
| Curing promotor | 2-Phenylimidazole |
| Diluent | Dipropylene glycol monomethyl ether acetate |

EXAMPLES 6–9

The components were mixed at proportions shown in Table 5 and kneaded with a three-roll mill to prepare a photocurable and thermosetting resin composition (actinic energy ray-curable resin composition).

TABLE 5

| Components and amounts (parts) | | Examples 6 | 7 | 8 | 9 |
|---|---|---|---|---|---|
| Varnish (solid content) | A | 100 | — | — | — |
| | B | — | 100 | — | — |
| | C | — | — | 100 | — |
| | D | — | — | — | 100 |
| Reactive Diluent | | 20 | 20 | 20 | 20 |
| Photopolymerization initiator | | 10 | 10 | 10 | 10 |
| Coloring pigment | | 1 | 1 | 1 | 1 |
| Silicone-based anti-foaming agent | | 1 | 1 | 1 | 1 |
| Epoxy resin | | 30 | 30 | 30 | 30 |
| Curing promotor | | 2 | 2 | 2 | 2 |
| Diluent | | 10 | 10 | 50 | 50 |

Evaluation of Qualty (6) Developability

Each of the photocurable and thermosetting resin compositions obtained in Examples 6–9 was applied by a screen printing method onto the entire surface of a copper-clad substrate and then dried by heating at 80° C. for 20 minutes. Thereafter, each substrate was exposed to light through a photomask with a prescribed exposure dose and then developed with an aqueous sodium carbonate solution used as a developing solution under the condition of a spraying pressure of 0.2 MPa for one minute. The developability was visually examined and rated on the following criterion.

◯: Complete development even in very small portions

Δ: Presence of undevelopped portions in the substrate surface

X: Almost no development (7) Adhesiveness

The photocurable and thermosetting resin compositions obtained in Examples 6–9 were each applied onto a copper-clad substrate to form a coating film of 20 μm thickness. Then, a pattern was formed under the same conditions as in the test for developability in item (6) mentioned above. The resultant substrate was thermally cured at 150° C. for 60 minutes to prepare a test substrate. This test substrate was incised like cross-cut in the shape of squares in a go board and then subjected to a peel test with a cellophane adhesive tape in accordance with the method specified in JIS (Japanese Industrial Standard) D-0202 to visually determine the degree of separation of the film based on the following criterion.

◯: 100/100 and perfect absence of any discernible change

Δ: 50/100–90/100

X: 0/100–50/100

(8) Resistance to Soldering Heat

Test substrates were prepared under the same conditions as in the test for adhesiveness in item (7) mentioned above by using the photocurable and thermosetting resin compositions obtained in Examples 6–9. Each of the test substrates was coated with a rosin type flux, immersed for 30 seconds in a solder bath set in advance at 260° C., then rinsed with isopropyl alcohol to remove the flux therefrom, and visually examined to find the extents of swelling, separation, and discoloration consequently produced in the resist layer on the test substrate.

◯: Perfect absence of any discernible change was found.

Δ: Swelling or separation of the coating film was not more than 20%.

X: Swelling or separation of the coating film was not less than 20%.

(9) Flexing Resistance

Each of the photocurable and thermosetting resin compositions obtained in Examples 6–9 was applied to a polyimide film to form a coating film of 20 μm thickness and a test substrate was prepared under the same conditions as in the test for adhesiveness in item (7) mentioned above. This test substrate was folded 180° over itself to visually evaluate the presence or absence of cracks in the film.

◯: Absence of crack in the film

Δ: Presence of slight cracks in the film

X: Presence of cracks in the entire surface of the film

The results of the above tests are collectively shown in Table 6.

TABLE 6

| Properties | Examples 6 | 7 | 8 | 9 |
|---|---|---|---|---|
| Developability | ◯ | ◯ | ◯ | ◯ |
| Adhesiveness | ◯ | ◯ | ◯ | ◯ |
| Resistance to soldering heat | ◯ | ◯ | ◯ | ◯ |
| Flexing resistance | ◯ | ◯ | ◯ | ◯ |

As being clear from the results shown in Table 6, the photocurable and thermosetting resin compositions of the present invention obtained in Examples 6–9 gave cured films excelling in flexing resistance, without deteriorating various properties possessed by the conventional cured film. Incidentally, the insulation resistance measured was the same results as that obtained by the conventional cured film.

As described above, the unsaturated polyester compound (A') of the present invention can be used in various application fields as a photocuring component and a thermosetting component of a curable composition. The curable composition of the present invention containing the unsaturated polyester compound mentioned above as a photocuring component and/or a thermosetting component cures promptly by short-time irradiation of an actinic energy ray and further is thermally curable by heating. Furthermore, since the unsaturated polyester compound has a main chain of the linear chain structure comprising ether linkages and ester linkages, the composition containing this compound as a curing component exhibits little shrinkage on curing and gives a cured product excelling in adhesiveness to various substrates, exhibiting high flexibility (flexing resistance) and strength in combination and further possessing good mechanical properties owing to the polyester structure of the main chain. Accordingly, this composition can be advantageously used in various application fields as various kinds of protective films, coating materials, adhesives, sealing compounds, printing ink, electrical insulating materials, various resists and interlaminar insulating materials for printed circuit boards, and the like.

Further, since the actinic energy ray-curable resin (A) of the present invention is obtained by further reacting (d) a polybasic acid anhydride with the unsaturated polyester compound (A') mentioned above, it is capable of curing promptly by short-time irradiation of an actinic energy ray, soluble in an aqueous alkaline solution, and excellent in thermal stability and resistance to heat. Accordingly, the composition of the present invention containing the actinic energy ray-curable resin mentioned above as a photocuring component cures promptly by short-time irradiation of an actinic energy ray such as an ultra-violet ray and an electron beams, can be developed with an aqueous alkaline solution, and gives a cured product exhibiting high flexibility (flexing resistance) and strength in combination and excelling in various preoperties such as adhesiveness to a substrate, resistance to heat, thermal stability, and electrical insulation properties. It is therefore useful in various technical field as the materials of solder resists and etching resists to be used for the production of printed circuit boards, interlaminar insulating materials for build-up boards, plating resists, the photosensitive dry films, and also in the production of fluorescent materials for PDP.

While certain specific working examples have been disclosed herein, the invention may be embodied in other specific forms without departing from the spirit or essential characteristics thereof. The described examples are therefore to be considered in all respects as illustrative and not restrictive, the scope of the invention being indicated by the appended claims rather than by the foregoing description and all changes which come within the meaning and range of equivalency of the claims are, therefore, intended to be embraced therein.

What is claimed is:

1. An unsaturated polyester compound having an ethylenically unsaturated group in its terminal and hydroxymethyl group as a pendant group attached to its main chain which is obtained by the reaction of (a) a compound containing at least two oxetane rings in its molecule with (b) a compound containing at least two carboxyl groups in its molecule and (c) an unsaturated monocarboxylic acid.

2. A curable composition, comprising (A') the unsaturated polyester compound set forth in claim 1 and (B) a polymerization initiator.

3. The curable composition according to claim 2, wherein said unsaturated polyester compound (A') is represented by the following general formula (1) and has an ethylenically unsaturated group in its terminal and hydroxymethyl group as a pendant group attached to its main chain

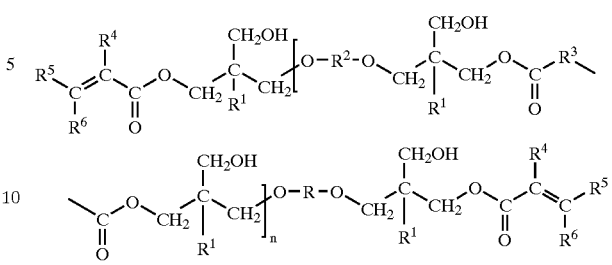

(1)

wherein $R^1$ represents a hydrogen atom or an alkyl group of 1 to 6 carbon atoms, $R^2$ represents a divalent oxetane residue, $R^3$ represents a dicarboxylic acid residue, $R^4$, $R^5$, and $R^6$ independently represent a hydrogen atom, an alkyl group of 1 to 6 carbon atoms, an aryl group, an aralkyl group, a cyano group, a fluorine atom, or a furyl group, and n is an integer of 1 to 300.

6. A process of producing an unsaturated polyester compound comprising the step of causing the reaction of (a) a compound containing at least two oxetane rings in its molecule with (b) a compound containing at least two carboxyl groups in its molecule and (c) an unsaturated monocarboxylic acid in the presence of a reaction promotor in such a proportion that the molar ratio of said compound (b) to said compound (a) falls in the range of 0.1<(b)/(a)<1.

7. The process according to claim 6, wherein said unsaturated monocarboxylic acid is added to a reaction mixture in such a proportion of 0.1 to 3.0 mols, based on one mole of an oxetanyl group of said compound (a).

8. The process according to claim 6, wherein said reaction promotor is at least one compound selected from the group consisting of a tertiary amine, a tertiary amine salt, a quaternary onium salt, a tertiary phosphine, a crown ether complex, and a phosphonium ylide and added to a reaction mixture in a proportion of 0.1 to 20 mol %, based on one mol of an oxetanyl group of said compound (a).

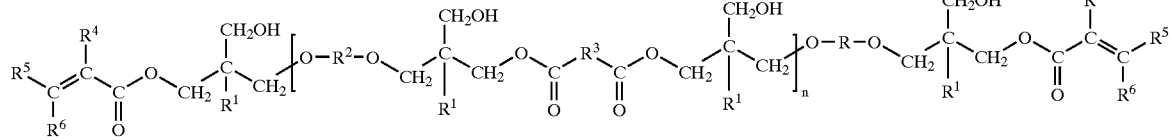

(1)

wherein $R^1$ represents a hydrogen atom or an alkyl group of 1 to 6 carbon atoms, $R^2$ represents a divalent oxetane residue, $R^3$ represents a dicarboxylic acid residue, $R^4$, $R^5$, and $R^6$ independently represent a hydrogen atom, an alkyl group of 1 to 6 carbon atoms, an aryl group, an aralkyl group, a cyano group, a fluorine atom, or a furyl group, and n is an integer of 1 to 300.

4. The curable composition according to claim 2, which contains said polymerization initiator (B) in an amount of 0.1 to 30 parts by weight, based on 100 parts by weight of said unsaturated polyester compound (A').

5. An unsaturated polyester compound represented by the following formula (1) and having an ethylenically unsaturated group in its terminal and hydroxymethyl group as a pendant group attached to its main chain:

9. An actinic energy ray-curable resin obtained by the reaction of a polybasic acid anhydride (d) with an unsaturated polyester compound (A') having an ethylenically unsaturated group in its terminal and hydroxymethyl group as a pendant group attached to its main chain, said compound (A') being obtained by the reaction of (a) a compound containing at least two oxetane rings in its molecule with (b) a compound containing at least two carboxyl groups in its molecule and (c) an unsaturated monocarboxytic acid.

10. A process of producing an actinic energy ray-curable resin comprising the steps of:

preparing an unsaturated polyester compound (A') having an ethylenically unsaturated group in its terminal and hydroxymethyl group as a pendant group attached to its main chain by the reaction of (a) a compound containing at least two oxetane rings in its molecule with (b) a compound containing at least two carboxyl groups in its molecule and (c) an unsaturated monocarboxylic acid in the presence of a reaction promotor in such a proportion that the molar ratio of said compound (b) to said compound (a) falls in the range of 0.1<(b)/(a)<1, and further reacting (d) a polybasic acid anhydride with said unsaturated polyester compound (A').

11. The process according to claim 10, wherein 0.1 to 1.0 mol of said polybasic acid anhydride (d) is caused to react with one chemical equivalent of hydroxymethyl group of said unsaturated polyester compound (A').

12. The process according to claim 10, wherein said reaction of said polybasic acid anhydride (d) with said unsaturated polyester compound (A') is carried out in the presence of at least one reaction promotor selected from the group consisting of a tertiary amine, a tertiary amine salt, a quaternary onium salt, a tertiary phosphine, a crown ether complex, and a phosphonium ylide and added to a reaction mixture in a proportion of 0.1 to 20 mol %, based on one mol of an oxetanyl group of said compound (a).

13. An actinic energy ray-curable resin composition, comprising (A) the actinic energy ray-curable resin set forth in claim 9 and (B) a photopolymerization initiator.

14. The actinic energy ray-curable resin composition according to wherein said actinic energy ray-curable resin (A) is a resin produced by the process set forth in claim 10.

15. The actinic energy ray-curable resin composition according to claim 13, which contains said photopolymerization initiator (B) in an amount of 0.1 to 30 parts by weight, based on 100 parts by weight of said actinic energy ray-curable resin (A).

16. An actinic energy ray-curable resin composition, comprising (A) the actinic energy ray-curable resin set forth in claim 9, (B) a photopolymerization initiator, (C) a diluent, and (D) a compound containing at least two oxirane groups and/or oxetanyl groups in its molecule.

17. The actinic energy ray-curable resin composition according to claim 16, wherein said actinic energy ray-curable resin (A) is a resin produced by the process set forth in claim 10.

18. The actinic energy ray-curable resin composition according to claim 16, which contains said photopolymerization initiator (B) in an amount of 0.1 to 30 parts by weight and said compound containing at least two oxirane groups and/or oxetanyl groups in its molecule (D) in an amount of 5 to 100 parts by weight, respectively based on 100 parts by weight of said actinic energy ray-curable resin (A).

19. The actinic energy ray-curable resin composition according to claim 16, further comprising a curing promotor in a proportion of 0.1 to 25 mol %, based on one mol of an oxirane group or oxetanyl group of said compound (D).

20. The actinic energy ray-curable resin composition according to claim 16, further comprising at least one additive selected from the group consisting of a filler, a coloring agent, an anti-foaming agent, an adhesiveness-imparting agent, and a leveling agent.

* * * * *

UNITED STATES PATENT AND TRADEMARK OFFICE
CERTIFICATE OF CORRECTION

PATENT NO. : 6,906,116 B2
DATED : June 14, 2005
INVENTOR(S) : Tadatomi Nishikubo et al.

It is certified that error appears in the above-identified patent and that said Letters Patent is hereby corrected as shown below:

<u>Title page,</u>
Item [57], ABSTRACT,
Line 9, "BY" should read --By --.

<u>Column 29,</u>
Line 26, "chain" should read -- chain, --.

<u>Column 31,</u>
Line 23, "to wherein" should read -- to claim 13, wherein --.

Signed and Sealed this

Sixth Day of December, 2005

JON W. DUDAS
*Director of the United States Patent and Trademark Office*